(12) United States Patent
Mantey et al.

(10) Patent No.: US 7,676,621 B2
(45) Date of Patent: Mar. 9, 2010

(54) COMMUNICATIONS BUS TRANSCEIVER

(75) Inventors: Paul J. Mantey, Fort Collins, CO (US); Michael D. Young, Fort Collins, CO (US); David R. Maciorowski, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 450 days.

(21) Appl. No.: 10/662,034

(22) Filed: Sep. 12, 2003

(65) Prior Publication Data

US 2005/0060472 A1 Mar. 17, 2005

(51) Int. Cl.
*G06F 13/14* (2006.01)
(52) U.S. Cl. .................. 710/305; 710/107; 710/308; 710/310; 714/704
(58) Field of Classification Search ............... 710/310, 710/107, 308, 20–23; 709/212; 370/506; 713/324, 400; 714/36, 47, 704
See application file for complete search history.

(56) References Cited

U.S. PATENT DOCUMENTS

| | | | |
|---|---|---|---|
| 3,810,120 A | 5/1974 | Huettner | |
| 4,387,441 A * | 6/1983 | Kocol et al. ............... | 710/3 |
| 4,486,829 A | 12/1984 | Mori et al. | |
| 4,577,060 A * | 3/1986 | Webb et al. .............. | 340/7.27 |
| 4,999,838 A | 3/1991 | Horikawa | |
| 5,230,044 A * | 7/1993 | Cao et al. ................. | 710/123 |
| 5,276,864 A | 1/1994 | Hernandez et al. | |
| 5,418,914 A | 5/1995 | Heil et al. | |
| 5,452,443 A | 9/1995 | Oyamada | |
| 5,475,850 A * | 12/1995 | Kahn ...................... | 710/110 |
| 5,513,319 A | 4/1996 | Finch et al. | |
| 5,530,946 A | 6/1996 | Bouvier et al. | |
| 5,590,299 A | 12/1996 | Bennett | |
| 5,613,157 A * | 3/1997 | Davidson et al. ............. | 710/8 |
| 5,630,054 A * | 5/1997 | Trang ........................ | 714/52 |
| 5,634,099 A * | 5/1997 | Andrews et al. ............ | 709/212 |
| 5,659,718 A * | 8/1997 | Osman et al. ............... | 713/400 |
| 5,729,767 A | 3/1998 | Jones et al. | |
| 5,784,547 A | 7/1998 | Dittmar | |
| 5,805,790 A | 9/1998 | Nota et al. | |
| 5,895,494 A | 4/1999 | Scalzi et al. | |
| 5,911,084 A | 6/1999 | Jones et al. | |
| 5,928,372 A * | 7/1999 | Yoshida ..................... | 714/704 |

(Continued)

FOREIGN PATENT DOCUMENTS

EP 0366434 A2 5/1990

(Continued)

OTHER PUBLICATIONS

Zitouni et al. Design of an Asynchronous VME bus Controller for Heterogeneous Systems. Dedicated Systems Magazine. 2000.*

(Continued)

*Primary Examiner*—Mark Rinehart
*Assistant Examiner*—Matthew D Spittle

(57) ABSTRACT

A computer system is disclosed that includes: a communications bus implemented in accordance with an Inter-IC bus specification; a bus controller coupled to the communications bus; a send machine coupled between a host processor and the bus controller; and a first-in first-out (FIFO) buffer coupled to the send machine and coupled between the host processor and the bus controller.

14 Claims, 17 Drawing Sheets

U.S. PATENT DOCUMENTS

| | | | |
|---|---|---|---|
| 6,061,600 A | | 5/2000 | Ying |
| 6,072,781 A | * | 6/2000 | Feeney et al. ............... 370/282 |
| 6,104,876 A | | 8/2000 | Daum et al. |
| 6,122,758 A | * | 9/2000 | Johnson et al. ............... 714/47 |
| 6,141,715 A | | 10/2000 | Porterfield |
| 6,145,036 A | | 11/2000 | Barenys et al. |
| 6,182,180 B1 | * | 1/2001 | Liu et al. ................... 710/310 |
| 6,182,267 B1 | | 1/2001 | Kidd et al. |
| 6,189,131 B1 | | 2/2001 | Graef et al. |
| 6,199,131 B1 | | 3/2001 | Melo et al. |
| 6,266,744 B1 | * | 7/2001 | Hughes et al. ............... 711/146 |
| 6,381,667 B1 | | 4/2002 | Brown |
| 6,449,289 B1 | * | 9/2002 | Quicksall ................... 370/475 |
| 6,580,898 B1 | | 6/2003 | Oguri |
| 6,625,683 B1 | * | 9/2003 | Khan et al. ................ 710/313 |
| 6,834,014 B2 | * | 12/2004 | Yoo et al. ............. 365/189.01 |
| 2003/0226050 A1 | * | 12/2003 | Yik et al. ................... 713/324 |
| 2005/0055489 A1 | * | 3/2005 | Elliott ........................ 710/310 |
| 2006/0020718 A1 | * | 1/2006 | Duresky et al. ............... 710/11 |

FOREIGN PATENT DOCUMENTS

| | | | | |
|---|---|---|---|---|
| EP | 0226353 B1 | | 4/1993 | |
| EP | 0572146 A2 | | 12/1993 | |
| EP | 0676696 A1 | | 10/1995 | |
| EP | 0533429 B1 | | 2/2000 | |
| EP | 1174798 A2 | * | 1/2002 | ............... 710/119 |
| EP | 1195688 A2 | | 4/2002 | |
| JP | 58114145 A | | 7/1983 | |
| JP | 04178754 A | | 6/1990 | |
| JP | 02257358 A2 | | 10/1990 | |
| JP | 04147347 A2 | | 5/1992 | |
| JP | 04163659 A | | 6/1992 | |
| JP | 04172537 A2 | | 6/1992 | |
| JP | 5216811 A2 | | 8/1993 | |
| JP | 09114750 A | | 5/1997 | |
| JP | 11015700 A2 | | 6/1997 | |
| JP | 2000076182 | | 3/2000 | |
| JP | 2001005775 | | 1/2001 | |
| JP | 2002269033 | | 9/2002 | |
| JP | 200399395 A | | 4/2003 | |
| WO | WO96/13774 | | 5/1996 | |
| WO | WO0157680 A3 | | 8/2001 | |
| WO | WO02/01347 A2 | | 1/2002 | |
| WO | WO02/01347 A3 | | 1/2002 | |

OTHER PUBLICATIONS

Ikezaki et al. Design of Home Bus Controller and Its Application Based on HBS Standard. IEEE Transactions on Consumer Electronics. vol. 34, No. 3, Aug. 1988.*

Advanced Micro Devices, Inc. AMD-766 Peripheral Bus Controller Data Sheet. Mar. 2001.*

The I2C-Bus Specification, Version 2.1, Jan. 2000, http://www.semiconductors.philips.com/acrobat/literature/9398/39340011.pdf.

GB Search Report dated Sep. 1, 2004 for GB application No. GB0409263.1.

GB Examination Report dated Jun. 28, 2006 for GB application No. GB0409263.1.

Non Final Office Action dated Apr. 3, 2006 for U.S. Appl. No. 10/437,981.

Final Office Action dated Sep. 1, 2006 for U.S. Appl. No. 10/437,981.

Notice of Allowance dated Nov. 7, 2006 for U.S. Appl. No. 10/437,981.

* cited by examiner

COMMUNICATIONS BUS TRANSCEIVER

CROSS REFERENCE TO RELATED APPLICATIONS

This application is related to U.S. patent application Ser. No. 10/437,981, filed on May 13, 2003, entitled "Detecting and Diagnosing a Malfunctioning Host Coupled to a Communications Bus," which is hereby incorporated by reference.

BACKGROUND

1. Field of the Invention

The present invention relates to communications buses for use in computer systems.

2. Related Art

Referring to FIG. 1, a prior art computer system 100 is shown in which three processors 102a-c communicate with each other over a communications bus 108. The processors 102a-c may, for example, be multiple processors within a single multi-processor computer, or processors in distinct computers communicating with each other over a network. As is well-known to those of ordinary skill in the art, processors 102a-c may transmit and receive data and/or instructions over the communications bus 108 using messages encoded according to a communications protocol associated with the communications bus 108. One example of a conventional communications bus is the Inter-IC ($I^2C$) bus.

The processors 102a-c are coupled to bus transceivers 106a-c over local buses 104a-c, respectively. To transmit a message over the communications bus 108 (also called a "system bus" to distinguish it from the local buses 104a-c), a processor queues the message at the corresponding bus transceiver. For example, for processor 102a to transmit a message over the communications bus 108 to processor 102b, processor 102a must transmit the message over local bus 104a to the corresponding bus transceiver 106a, where the message is queued. Bus transceiver 106a then negotiates for control of the communications bus 108 in accordance with the bus protocol to become a bus master, and transmits the message over the communications bus 108 to the destination bus transceiver 106b. Bus transceiver 106b forwards the message to the destination processor 102b, and the originating bus transceiver 106a indicates to the processor 102a (by transmitting an appropriate message over the local bus 104a) that the message has successfully been sent.

Each new generation of multiprocessor computer tends to include a greater number of faster processors coupled to the bus 108 than the previous generation, thereby increasing the bandwidth demands placed on the bus 108. As the number and speed of processors connected to the bus 108 increases, it becomes increasingly important that the bus transceivers 106a-c process messages efficiently, accurately, and without hanging the bus 108.

SUMMARY

In one aspect of the present invention, a computer system is provided that includes two or more of the following features in combination: a communications bus (such as an $I^2C$ bus); a bus controller coupled to the communications bus; a send machine coupled between a host processor and the bus controller, the send machine comprising means for transmitting the plurality of bytes over the communications bus without interrupting the host processor; a first first-in first-out (FIFO) buffer coupled to the send machine and coupled between the host processor and the bus controller, the first FIFO comprising means for receiving a plurality of bytes from the host processor without interrupting the host processor; a receive machine coupled between the host processor and the bus controller, the receive machine comprising means for receiving the plurality of bytes over the communications bus without interrupting the host processor; a second FIFO buffer coupled to the receive machine and coupled between the host processor and the bus controller, the second FIFO buffer comprising means for receiving a plurality of bytes from the bus controller without interrupting the host processor; means for receiving a message from the host processor; means for attempting to send the message over the communications bus to a target device; means for determining whether the message was received without errors by the target device; retry means for attempting again to send the message over the communications bus to the target device without interrupting the host processor if it is determined that the message was not received without errors by the target device; busfree count means for storing a busfree count associated with the computer system; a busfree timer for use by the computer system to wait an amount of time specified by the busfree count prior to attempting to access the communications bus after the communications bus becomes available for use; a fair arbitration block coupled between the host processor and the bus controller, the fair arbitration block comprising arbitration means for modifying the busfree count according to a priority signal to produce an arbitrated busfree count signal; and a byte timer coupled between the bus controller and the host processor, the byte timer comprising means for determining whether the host processor has failed and means for generating a signal indicating whether the host processor has failed.

In another aspect of the present invention, a method is provided for transmitting a message including a plurality of bytes over a communications bus (such as an $I^2C$ bus). The method includes steps of: (A) receiving at least two of the plurality bytes from a host processor; and (B) transmitting the at least two of the plurality of bytes over the communications bus without interrupting the host processor.

The host processor may be interrupted after step (B). Prior to step (B), the at least two of the plurality bytes may be stored in a buffer without interrupting the host processor, and the step (B) may include steps of: (B)(1) retrieving the at least two bytes from the buffer; and (B)(2) transmitting the at least two bytes over the bus without interrupting the host processor. The step (C) may include a step of storing the plurality of bytes of the message in the buffer without interrupting the host processor.

In yet another aspect of the present invention, a method is provided for receiving a message comprising a plurality of bytes over a communications bus (such as an $I^2C$ bus). The method may be used in a computer system including a host processor. The method includes steps of: (A) receiving at least two of the plurality of bytes over the communications bus without interrupting the host processor; and (B) transmitting the at least two of the plurality of bytes of the message to the host processor.

The method may further include steps of: (C) prior to step (B), storing the at least two of the plurality of bytes of the message in a buffer without interrupting the host processor; and (D) after step (C), interrupting the host processor. Step (B) may include a step of transmitting the at least two of the plurality of bytes of the message from the buffer to the host processor. Step (C) may include a step of storing the at least two bytes in the buffer until the buffer reaches a predetermined high water mark.

In yet a further aspect of the present invention, a method is provided for transmitting a message including a plurality of bytes from a source device having a first host processor to a destination device having a second host processor over a communications bus (such as an I²C bus). The method includes steps of: (A) at the source device, receiving at least two of the plurality of bytes from the first host processor; (B) at the source device, storing the at least two of the plurality of bytes in a first buffer; (C) at the source device, transmitting the at least two bytes of the message from the first buffer to the destination device over the communications bus without interrupting the first host processor; (D) at the destination device, receiving the at least two bytes of the message without interrupting the second host processor; (E) at the destination device, storing the at least two bytes in a second buffer; and (F) at the destination device, transmitting the at least two bytes from the second buffer to the second host processor.

The step (B) may include a step of storing the at least two of the plurality of bytes in the first buffer without interrupting the first host processor. The step (E) may include a step of storing the at least two of the plurality of bytes in the second buffer without interrupting the second host processor.

In another aspect of the present invention, a computer-implemented method is provided that includes steps of: (A) initializing a receive checksum; (B) receiving a first portion of a message over a communications bus; (C) updating the receive checksum based on the first portion of the message; (D) receiving a subsequent portion of the message over the communications bus; (E) updating the receive checksum based on the subsequent portion of the message; and (F) after steps (A)-(E), transmitting the first and subsequent portions of the message to a host processor. Steps (A)-(E) may be performed without interrupting the host processor.

In a further aspect of the present invention, a computer-implemented method is provided for use in a computer system including a communications bus (such as an I²C bus). The method includes steps of: (A) receiving a message from a host processor; (B) attempting to transmit the message over the communications bus to a target device; (C) determining whether the message was received without errors by the target device; (D) if it is determined that the message was not received without errors by the target device, returning to step (B) without interrupting the host processor.

The method may further include a step of: (E) prior to step (A), initializing a retry counter to a predetermined retry count value. Step (D) may include steps of: (D)(1) returning to step (B) if step (B) has been performed a number of times that is equal to the predetermined retry count value; and (D)(2) signaling an error to the host processor otherwise.

The method may further include a step of: (E) prior to step (B), storing the at least some of the message in a buffer; and the step (D) may include steps of: (D)(1) determining whether the beginning of the message is in the buffer; and (D)(2) returning to step (B) if it is determined that the message was not received without errors by the target device and that the beginning of the message is in the buffer.

Other features and advantages of various aspects and embodiments of the present invention will become apparent from the following description and from the claims.

DETAILED DESCRIPTION

Figure 1:
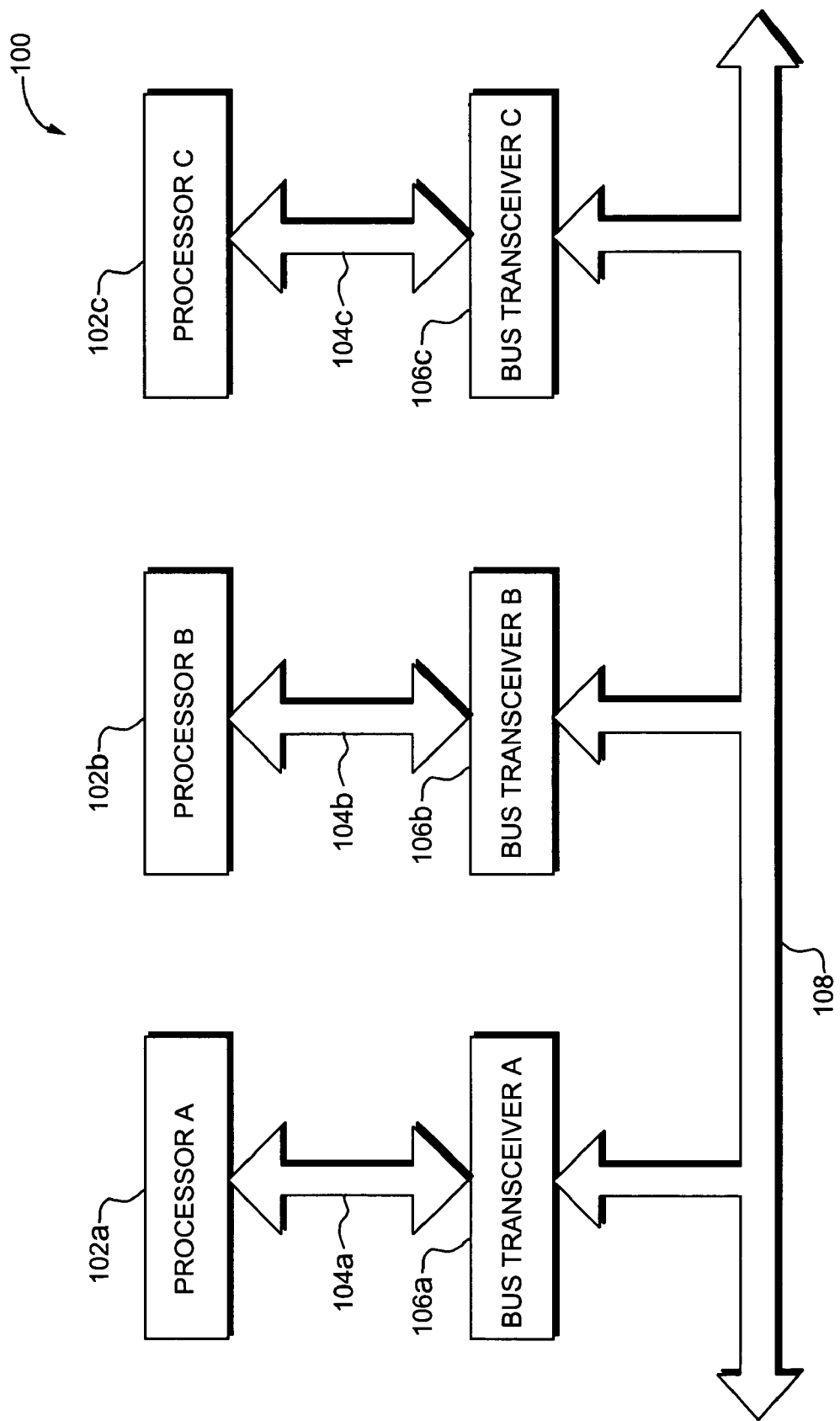
FIG. 1 is block diagram of a prior art multiprocessor computer system including three processors coupled to a shared communications bus through corresponding bus transceivers.
Figure 2A:
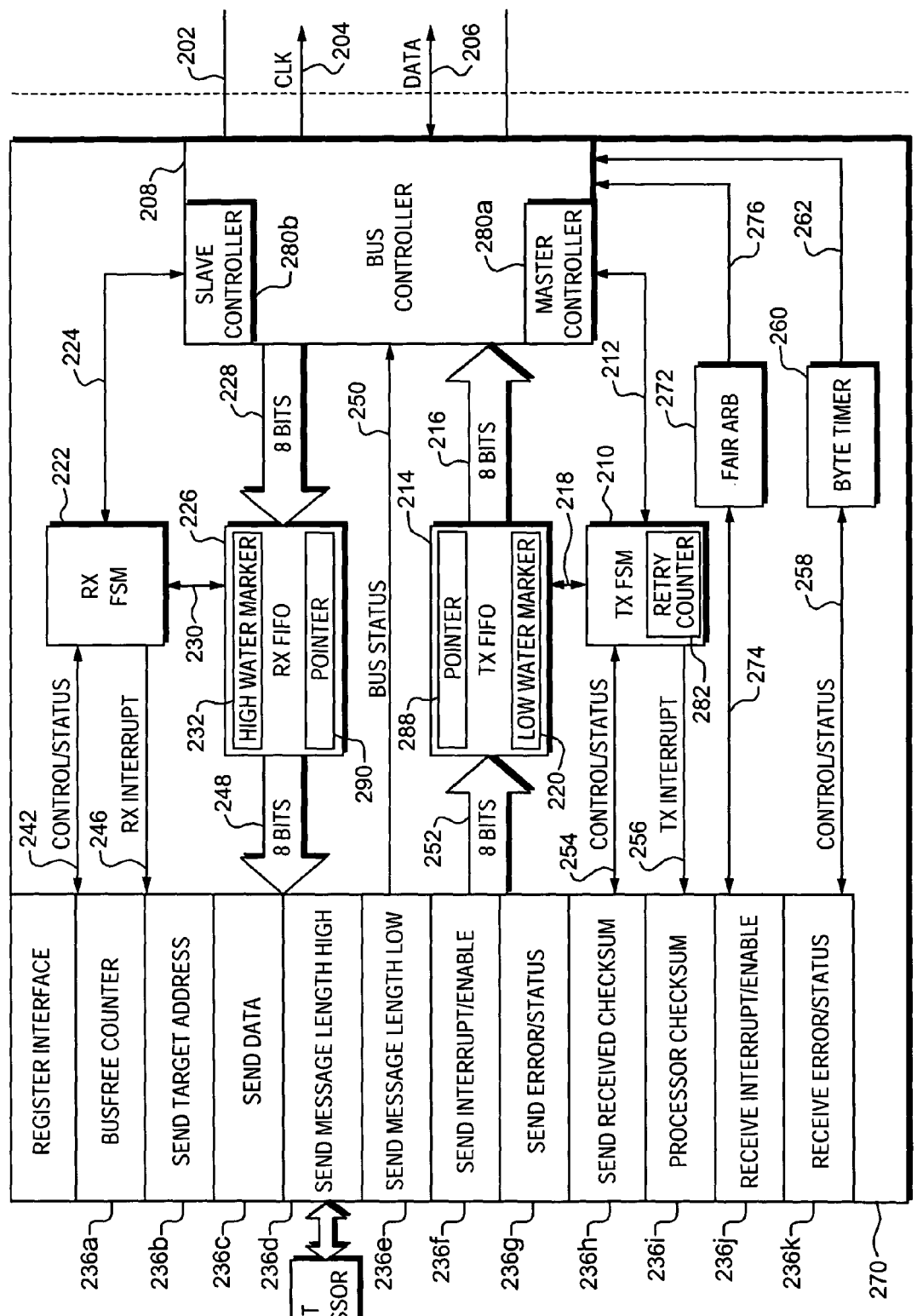
FIG. 2A is a diagram of a computer system 200 including a bus transceiver according to one embodiment of the present invention.

Referring to FIG. 2A, a diagram is shown of a computer system 200 including a bus transceiver 270 according to one embodiment of the present invention. The system 200 includes a communications bus 202 (also referred to as a "system bus") and a host processor 238 coupled to the bus 202 through the bus transceiver 270 over local bus 240. Although only the single processor 238 and bus transceiver 270 are shown in FIG. 2A, the processor 238 and bus transceiver 270 may be coupled over the bus 202 to other processors and transceivers using, for example, the topology shown in FIG. 1. The bus 202 may, for example, be a manageability bus that is used to send console data, configuration information, chassis codes, diagnostic data, and other information from a cell board to a manageability processor.

The bus 202 may, for example, be an I²C bus. The architecture and operation of the I²C bus is defined in a document entitled "The I²C-Bus Specification," available from Philips Semiconductors. Version 2.1 of "The I²C-Bus Specification," dated January 2000, is incorporated by reference herein in its entirety. The bus 202 may, however, be any kind of bus.

The bus 202 includes a clock line 204 and data line 206. The transceiver 270 includes a bus master/slave controller 208 (also referred to herein simply as a "bus controller"). The bus controller 208 implements bus communications functionality in accordance with the I²C specification, such as the ability to send and receive packets defined according to the I²C specification. Those having ordinary skill in the art will appreciate how to implement the bus controller 208 based on the I²C specification.

The transceiver 270 includes a register interface 236 that includes a plurality of registers 236a-k. The bus controller 208 communicates with register interface 236 over interface 250. As described in more detail below, the host processor 238 and transceiver 270 communicate with each other by writing and reading values to and from registers 236a-k in the register interface 236. For example, interrupts are signaled to the processor 238 by various components of the transceiver 270 by modifying values of the registers 236a-k. Therefore, when the discussion herein refers to transmission of messages and/or interrupts between the host processor 238 and components of the transceiver 270, it should be appreciated that such messages and/or interrupts are communicated through the register interface 236. Furthermore, the bus controller 208 includes a master controller 280a and a slave controller 280b. The send machine 210 communicates over the bus 202 through the master controller 280a, and the receive machine 222 communicates over the bus 202 through the slave controller 280b.

The transceiver 270 also includes a finite state machine 210 (referred to as a "send machine") that controls transmission of messages by the processor 238 over the bus 202. Send machine 210 communicates with controller 208 via control/status signals 212.

The transceiver 270 also includes a first-in first-out (FIFO) buffer 214 (referred to as a "send FIFO") that is coupled: (1) to the register interface 236 over an 8-bit internal bus 252; (2) to the controller 208 over an 8-bit internal bus 216; and (3) to the send machine 210 over a control interface 218. As described in more detail below, messages transmitted by the processor 238 for transmission over the bus 202 are buffered in the send FIFO 214 and transmitted from the send FIFO 214 over the bus 202 under control of the send machine 210.

As mentioned above, the send machine 210 communicates with the processor 238 through the register interface 236. For example, the send machine 210 communicates control and status information to and from the processor 238 via control/status signals 254, and signals interrupts to the processor 238 via send interrupt signals 256, all of which are coupled to the processor 238 through the register interface 236.

The transceiver 270 also includes a finite state machine 222 (referred to as a "receive machine") that controls receipt of messages by the processor 238 over the bus 202. Receive machine 222 communicates with controller 208 via control/status signals 224.

The transceiver 270 also includes a FIFO 226 (referred to as a "receive FIFO") that is coupled: (1) to the register interface 236 over an internal 8-bit bus 248; (2) to the controller 208 over an internal 8-bit bus 228; and (3) to the receive machine 222 over a control interface 230. As described in more detail below, messages received over the bus 202 are buffered in the receive FIFO 226 and read from the receive FIFO 226 over the bus 248 by processor 238.

The receive machine 222 communicates with the processor 238 through the register interface 236. For example, the receive machine 222 communicates control and status information to and from the processor 238 over a control/status interface 242, and signals interrupts to the processor 238 over receive interrupt line 246, both of which are coupled to the processor 238 through the register interface 236. The send machine 210 and receive machine 222 may be used to send/receive multiple message bytes consecutively over the bus 202 without interrupting the host processor 238, thereby increasing the effective bandwidth of the bus 202 in comparison with bus transceivers that interrupt the host processor 238 after transmission/receipt of each message byte.

The bus transceiver 270 may use a message checksum to determine whether a message transmitted over the bus 202 has been received without errors. In particular, the receive machine 222 may generate a checksum for a message as the receive machine 222 receives the message over the bus 270. Using the receive machine 222, rather than the host processor 238, to generate the checksum lightens the processing load placed on the processor 238. Furthermore, generating the checksum while the message is being received may enable the message to be transmitted more efficiently than systems in which the checksum is generated after the message is received.

If the send machine 210 fails to transmit a message in its entirety without errors, the send machine 210 may attempt to retry transmission of the message without interrupting the host processor 238. Automatically retrying message transmission in this way may reduce the load on the host processor 238 and decrease overall message transmission time in comparison to systems that require the host processor 238 to initiate each attempt to transmit a message over the bus 202.

Devices that communicate over a communications bus typically must negotiate for control of the bus before engaging in a transaction over the bus. Situations may arise in which a particular device on the bus repeatedly wins the negotiation for the bus, thereby "starving" out other devices and preventing them from communicating over the bus. Register interface 236 includes a busfree count register 236a that typically specifies the amount of time that the bus controller 208 is to wait after detecting that the bus 202 is idle before attempting to gain ownership of the bus 202. Transceiver 270 includes a fair arbitration block 272, which receives the contents of the busfree count register 236a via signals 274, modifies the value, and provides an arbitrated busfree count value to the bus controller 208 using signals 276. By modifying the value of the busfree count register 236a appropriately, the likelihood that one device will starve out other devices on the bus 202 may be reduced or even eliminated. Operation of the fair arbitration block 272 is described in more detail below with respect to FIG. 12.

Transceiver 270 also includes a byte timer 260 that communicates with register interface 236 using control/status signals 258. Byte timer 260 communicates with controller 208 using signals 262. In general, the purpose of byte timer 260 is to ensure that the host processor 238 and the bus transceiver 270 do not cause the bus 202 to hang. For example, byte timer 260 may determine whether processor 238 has failed or otherwise malfunctioned and whether the bus transceiver 270 itself has failed or otherwise malfunctioned. If the byte timer 260 determines that the host processor 238 has malfunctioned, the byte timer 260 may, for example, transmit a failure message to one or more other bus transceivers on the bus 202 indicating that the host processor 238 has malfunctioned. Alternatively, for example, the bus transceiver 270 may respond to subsequent communications from other bus transceivers with a failure message. The other bus transceivers may suspend communication with the host processor 238 and thereby avoid hanging the bus 202. These and other techniques that may be implemented in conjunction with the byte timer 260 are disclosed in more detail in the above-referenced patent application entitled "Detecting and Diagnosing a Malfunctioning Host Coupled to a Communications Bus."

Figure 3:
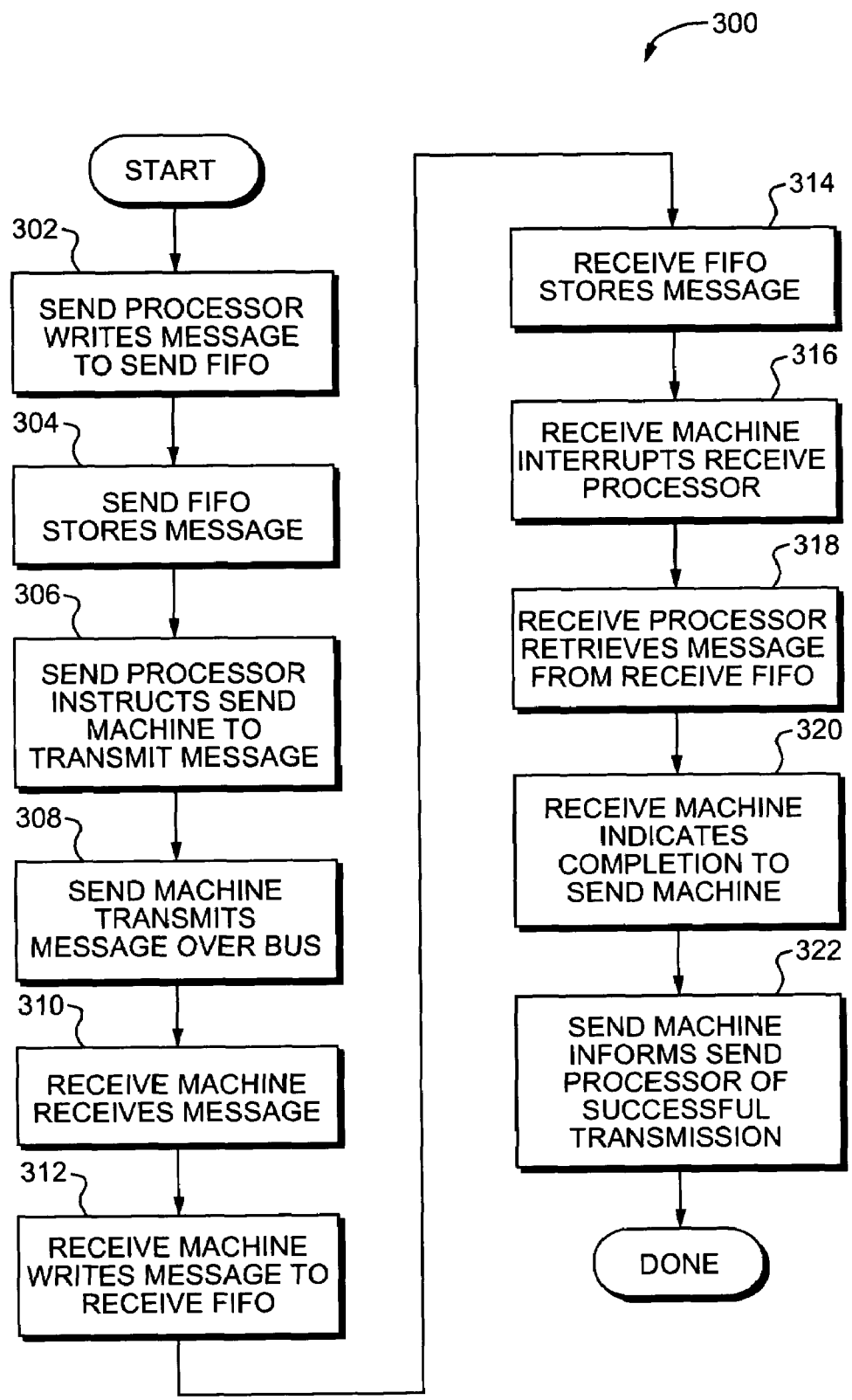
FIG. 3 is a flowchart of a method used by the transceiver of FIG. 2A to transmit a message over a communications bus according to one embodiment of the present invention.
Figure 4:
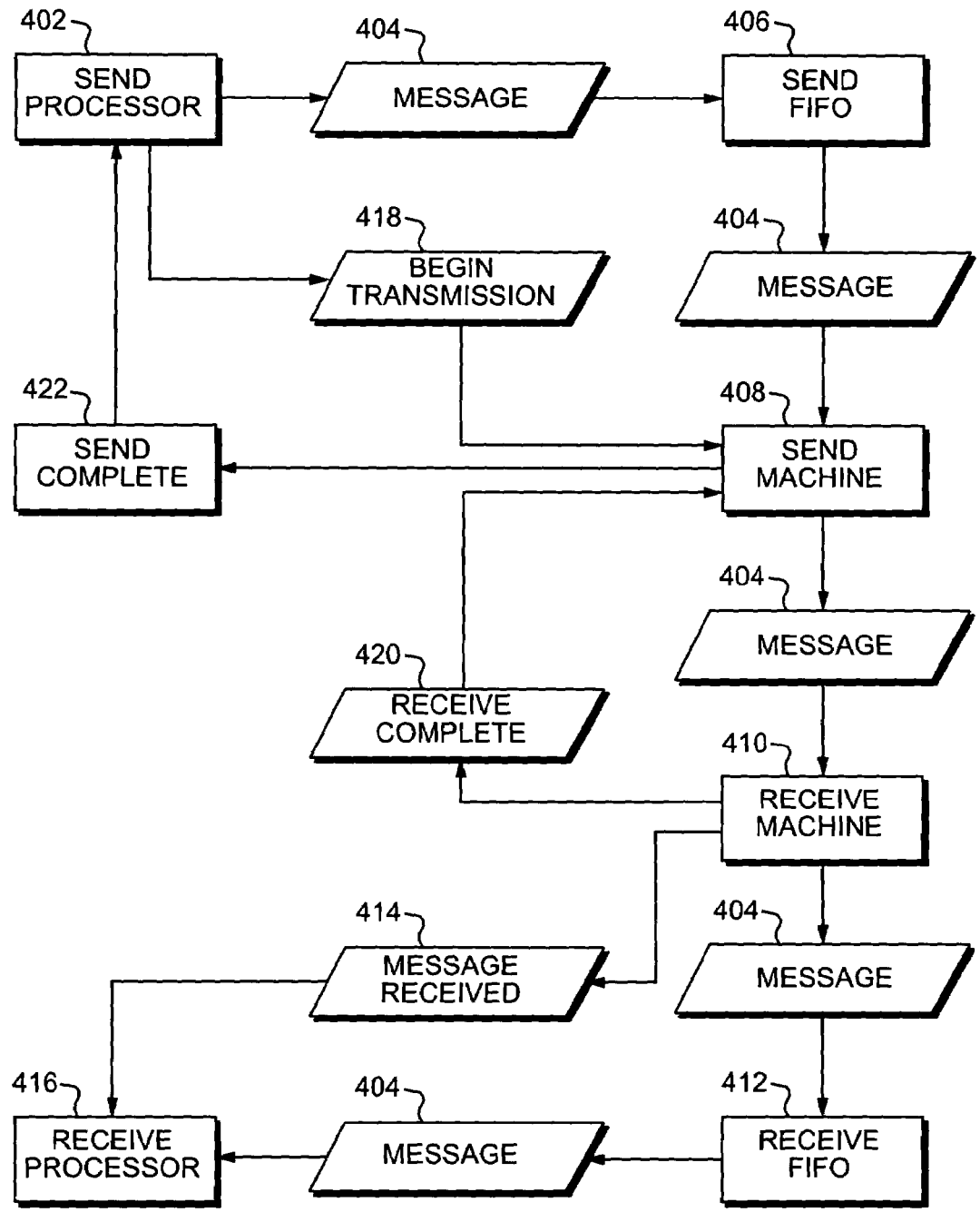
FIG. 4 is a dataflow diagram illustrating the flow of data resulting from performance of the method of FIG. 3 according to one embodiment of the present invention.

Examples of techniques will now be described that may be used by the transceiver 270 to send and receive a message over the bus 202 according to one embodiment of the present invention. Referring to FIG. 3, a flowchart is shown of a method 300 that may be used by the transceiver 270 to transmit a message that is smaller than the capacity of the send FIFO 214. Referring to FIG. 4, a dataflow diagram is shown illustrating the flow of data resulting from execution of the method 300. Particular techniques that may be used to implement the method 300 when the bus 202 is an $I^2C$ bus will be described in more detail below with respect to FIGS. 13-15.

In the embodiment illustrated by FIGS. 3-4, a first processor 402 (referred to as a "send processor") transmits a message 404 to a second processor 416 (referred to as a "receive processor") over the bus 202. The processor 238 (FIG. 2A) may, for example, be the send processor 402 or the receive processor 416. The send processor 402 and receive processor 416 may each be coupled to the bus 202 through a corresponding bus transceiver such as the transceiver 270 shown in FIG. 2A.

The send processor 402 writes the message 404 to its send FIFO 406 (step 302), which stores the message 404 (step 304). The send processor 402 initiates a "begin transmission" command 418 to the send machine 408 instructing the send machine 408 to transmit the message 404 over the bus 202 (step 306). In response, the send machine 408 transmits the message 404 over the bus 202 with the receive machine 416 as the target (step 308). Note that the message 404 may be reformatted appropriately as it travels between the send processor 402 to the send FIFO 406, the send machine 408, and the bus 202 using techniques well-known to those of ordinary skill in the art.

The receive machine 410 receives the message 404 over the bus 202 (step 310) and writes the message 404 to the receive FIFO 412 (step 312), which stores the message 404 (step 314). The receive machine 410 interrupts the receive processor 416 by asserting a receive message interrupt 414 to the receive processor (step 316). In response, the receive processor 416 retrieves the message 404 from the receive FIFO 412 (step 318).

Once the receive machine 410 has received all data bytes in the message 404, the receive machine 410 transmits a "receive complete" message 420 over the bus 202 to the send machine 408 (step 320), in response to which the send machine 408 interrupts the send processor 402 by asserting a "send complete" interrupt 422 to the send processor 402 (step 322), thereby indicating to the send processor 402 that message 404 has been successfully received. Note that in the example illustrated by FIGS. 3-4, the send processor 402 is not interrupted until the entire message 404 has been transmitted over the bus 202.

Figure 5:
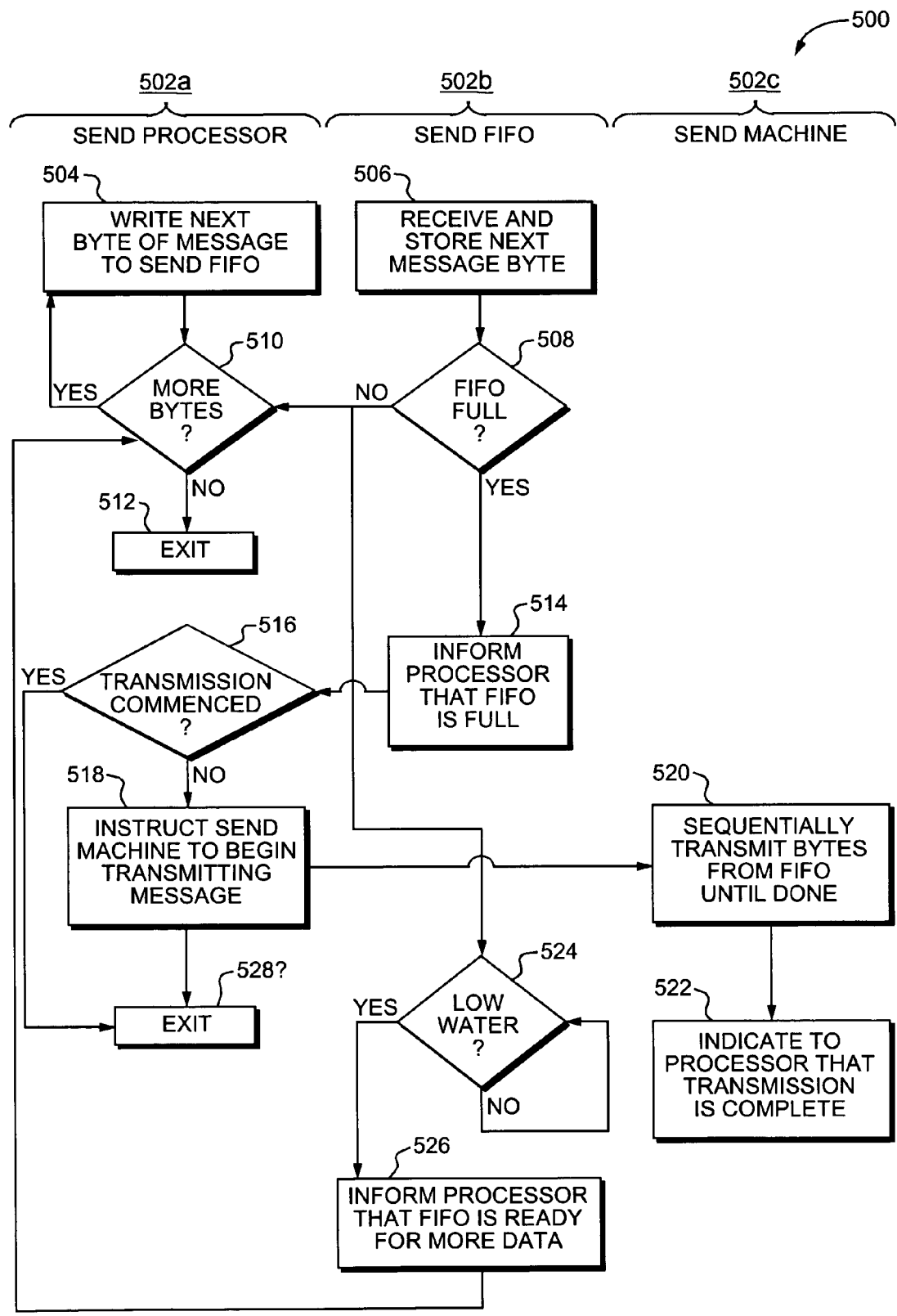
FIG. 5 is a flowchart of a method used by the transceiver of FIG. 2A to transmit a message over a communications bus according to another embodiment of the present invention.
Figure 6:
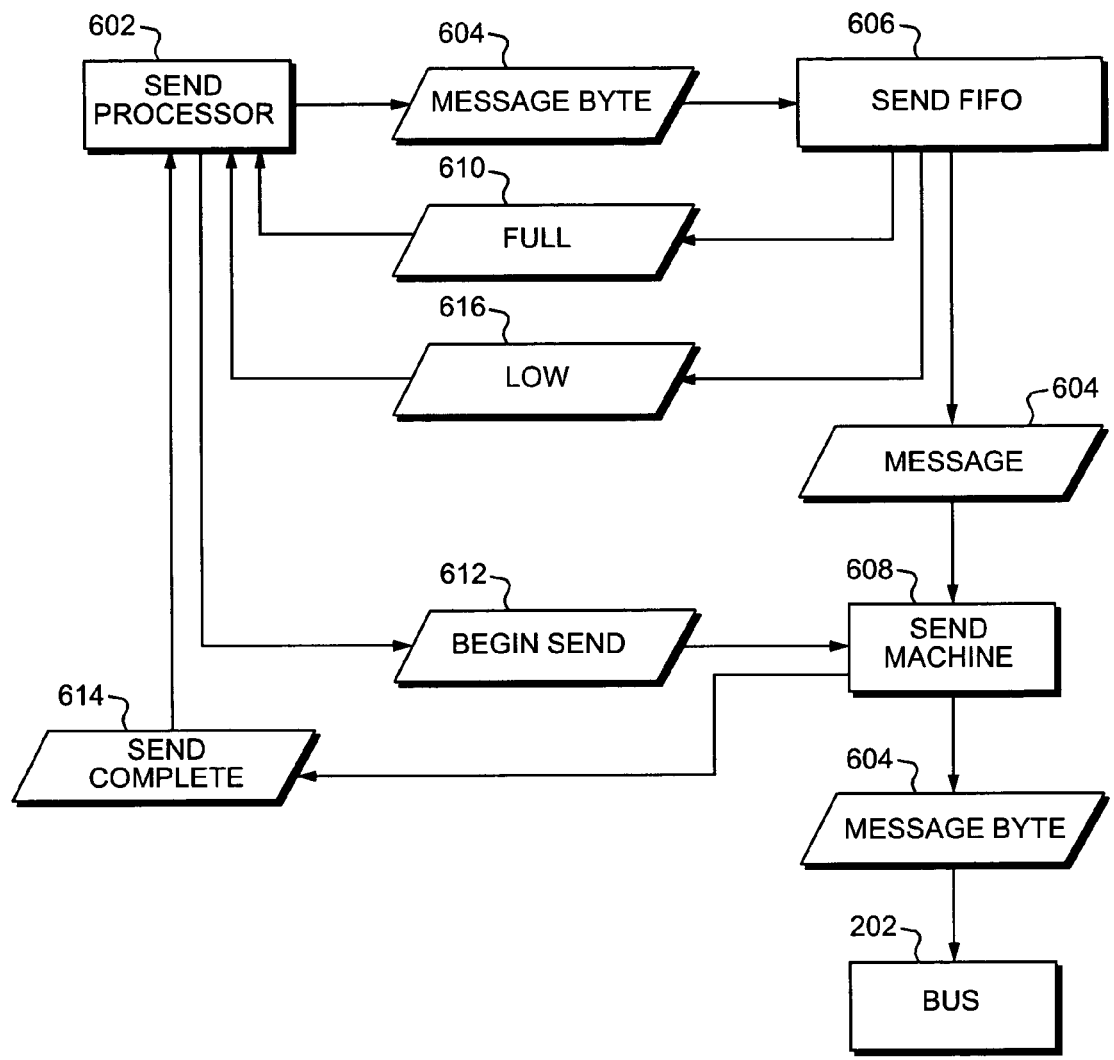
FIG. 6 is a dataflow diagram illustrating the flow of data resulting from performance of the method of FIG. 5 according to one embodiment of the present invention.

Examples of techniques will now be described that may be used by the transceiver 270 to send and receive a message over the bus 202 according to another embodiment of the present invention. Referring to FIG. 5, a flowchart is shown of a method 500 that may be used by the transceiver 270 to transmit a message that is longer than the capacity of the send FIFO 214. Referring to FIG. 6, a dataflow diagram is shown illustrating the flow of data resulting from execution of the method 500. Techniques that may be used to receive a message transmitted using the techniques shown in FIGS. 5-6 will be described below with respect to FIGS. 7-8.

The flowchart of the method 500 shown in FIG. 5 is divided into three columns 502a-c for ease of illustration and explanation. Flowchart elements in column 502a represent actions performed by a send processor 602 (such as processor 238); flowchart elements in column 502b represent actions performed by a send FIFO 606 (such as send FIFO 214); and flowchart elements in column 502c represent actions performed by a send machine 608 (such as send machine 210). Although the steps of method 500 are described in a particular sequence herein, steps of method 500 may be performed in other orders and/or in parallel with each other. The same is true of other methods disclosed herein, such as the methods described below with respect to FIGS. 7 and 9.

The send processor 602 writes a byte 604 of a message to its send FIFO 606 (step 504), in which the message byte 604 is stored (step 506). The send FIFO 606 determines whether it is full (step 508). If the send FIFO 606 is not full, the send processor 602 determines whether it has additional message bytes to write to the FIFO 606 (step 510). If the send processor 602 has more message bytes to write, the send processor 602 writes the next message byte 604 to the send FIFO 606 (step 504), which stores the byte 604 (step 506). In this way, the send processor 602 stores a set of message bytes in the send FIFO 606 without being interrupted.

If the send processor 602 has no more message bytes to write (step 510), the send processor 602 exits the method 500 (step 512). Note that the send FIFO 606 and send machine 608 may continue to perform steps of the method 500 after the send processor 602 writes the last message byte to the send FIFO 606.

If the send FIFO 606 determines that it is full (step 508), the send FIFO 606 asserts a "buffer full" interrupt 610 to the send processor 602 (step 514). In response to receiving the buffer full interrupt 610, the processor 602 determines whether the message has already begun to be transmitted over the bus 202 (step 516). The send processor 602 may make this determination by, for example, maintaining a flag that is initialized to a default value and that is toggled to a non-default value once transmission of the message over the bus 202 commences (e.g., in step 518, below).

If the send processor 602 determines that transmission of the message over the bus 202 has not commenced, the send processor 602 instructs the send machine 608 to begin transmitting the message over the bus 202 by initiating a "begin send" command 612 to the send machine 608 (step 518). The processor 602 then exits the method 500 (step 520). The processor 602 may also exit the method 500 (step 520) if it is determined in step 516 that message transmission over the bus 202 has already commenced.

In response to receiving the "begin send" command 612, the send machine 608 begins retrieving bytes from the send FIFO 606 and transmitting them over the bus 202 until transmission of the message is complete (step 520). Techniques that may be used by the send machine 608 to transmit bytes from the send FIFO 606 over the bus will be described in more detail below with respect to FIGS. 13-14. Once transmission of the message is complete, the send machine 608 asserts a "send complete" interrupt 614 to the send processor 602 indicating that transmission of the message is complete (step 522). If any errors were encountered while transmitting the message, the send complete interrupt 614 may indicate such errors for appropriate handling by the processor 602.

The number of message bytes stored in the send FIFO 606 decreases as the send machine 608 retrieves message bytes from the send FIFO 606. Referring to FIG. 2A, send FIFO 214 includes a low water marker 220 which indicates the level at which the send FIFO 214 is ready to receive additional message bytes from the send processor 602.

Assume, for example, that the send FIFO 214 has a capacity of 16 bytes and that the low water marker 220 specifies a value of 4 bytes. The send FIFO 606 monitors the number of bytes that it contains and determines whether that number of bytes is less than or equal to the number of bytes specified by the low water marker 220 (step 524). When the number of bytes in the send FIFO 606 is greater than the number of bytes specified by the low water marker 220, the send FIFO 606 does nothing. When the number of bytes in the send FIFO 606 is less than or equal to the number of bytes specified by the low water marker 220, the send FIFO 606 indicates to the processor 602 that the send FIFO 606 is ready to receive more message bytes (e.g., by asserting a "low water" interrupt 616 to the processor 602) (step 526).

In response to receiving the low water interrupt 616, the send processor 602 determines whether it has any more message bytes to send (step 510). If it does, it writes additional message bytes to the send FIFO 606 until the send FIFO 606 is full or the end of the message packet is reached (steps 504-510). In this way the send processor 602 writes blocks of message bytes to the send FIFO 606, without being interrupted during the transmission of each byte.

Figure 7:
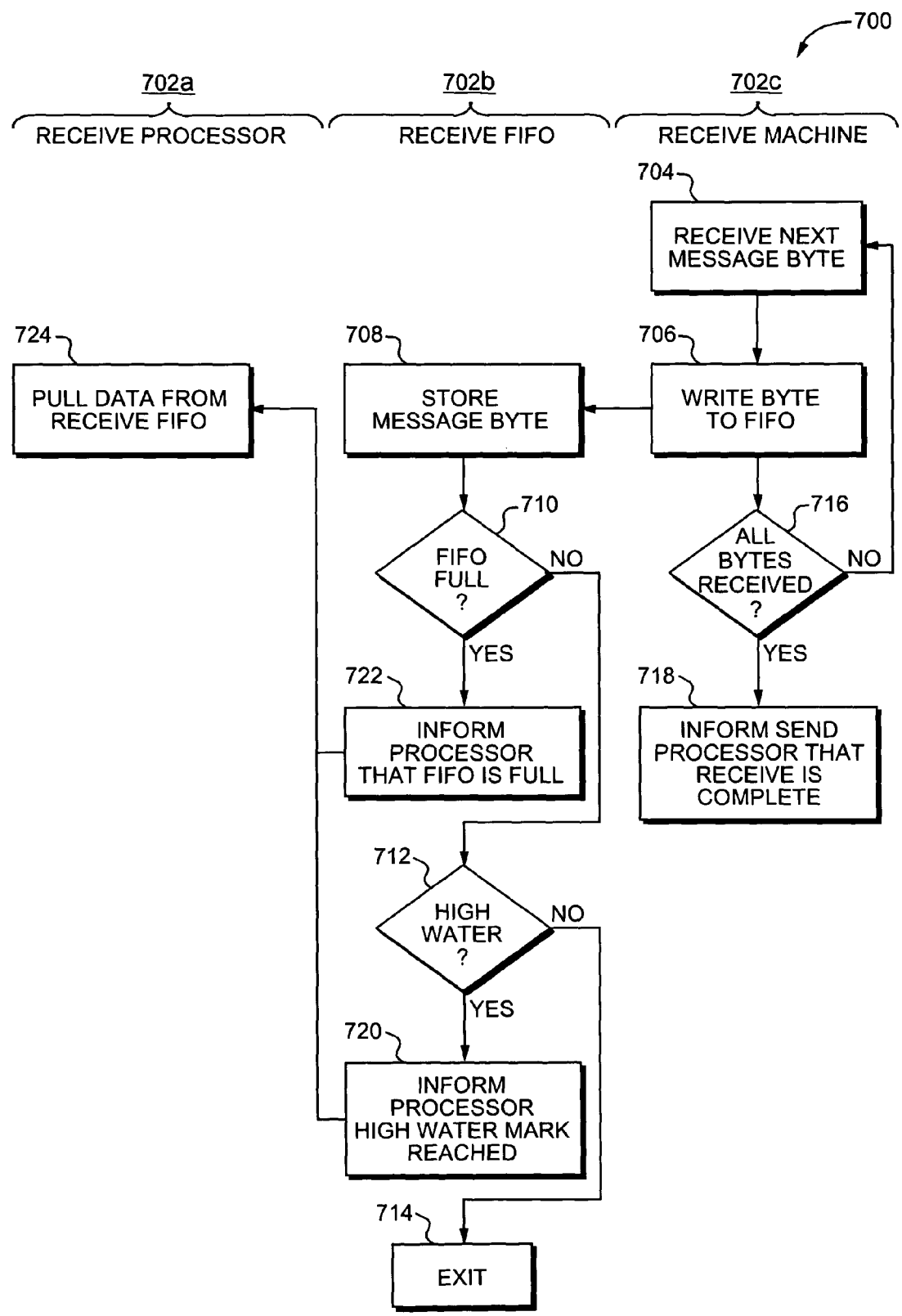
FIG. 7 is a flowchart of a method used by the transceiver of FIG. 2A to receive a message over a communications bus according to one embodiment of the present invention.
Figure 8:
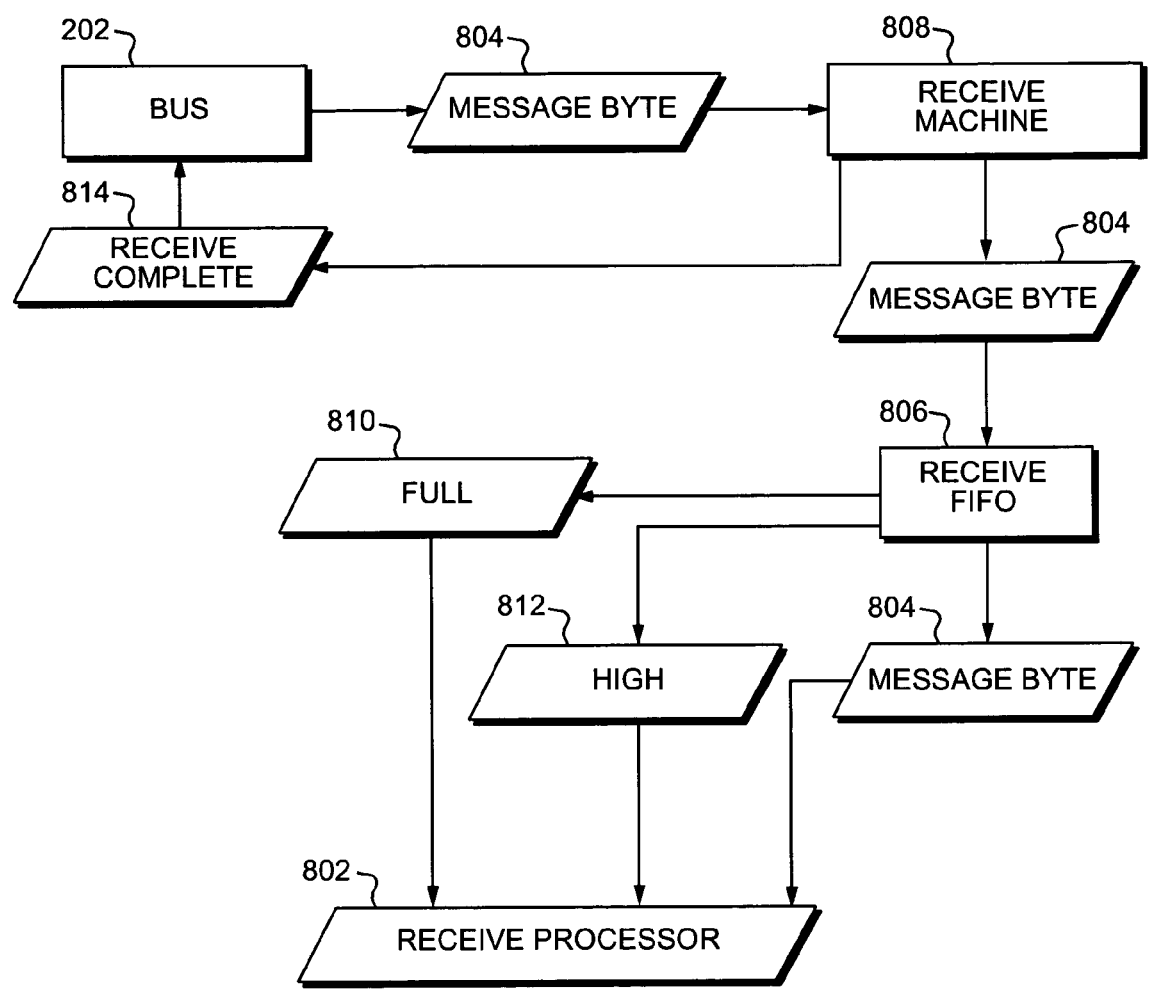
FIG. 8 is a dataflow diagram illustrating the flow of data resulting from performance of the method of FIG. 7 according to one embodiment of the present invention.

Examples of techniques will now be described that may be used by the transceiver 270 to receive a message over the bus 202 according to another embodiment of the present invention. Referring to FIG. 7, a flowchart is shown of a method 700 that may be used by the transceiver 270 to receive a message that is longer than the capacity of the receive FIFO 232 and that is transmitted using the method 500 shown in FIG. 5. Referring to FIG. 8, a dataflow diagram is shown illustrating the flow of data resulting from performance of the method 700.

The flowchart of the method 700 shown in FIG. 7 is divided into three columns 702a-c for ease of illustration and explanation. Flowchart elements in column 702a represent actions performed by a receive processor 802 (such as processor 238); flowchart elements in column 702b represent actions performed by a receive FIFO 806 (such as receive FIFO 226); and flowchart elements in column 702c represent actions performed by a receive machine 808 (such as receive machine 222).

The receive machine 808 receives a message byte 804 transmitted over the bus 202 by the send machine 608 in step 504 of method 500 (step 704). The receive machine 808 writes the message byte 804 to its receive FIFO 806 (step 706), which stores the message byte 804 (step 708).

The receive FIFO 806 determines whether it is full (step 710). If the receive FIFO 806 determines that it is full, the receive FIFO 806 asserts a "full" interrupt 810 to the receive processor 802 (step 722).

Referring to FIG. 2A, receive FIFO 226 includes a high water marker 232 which indicates the level at which the receive FIFO 226 is ready to begin (or resume) providing data to the receive processor 802. Assume, for example, that the receive FIFO 806 has a capacity of 16 bytes and that the high water marker 232 specifies a value of 12 bytes. The receive FIFO 806 monitors the number of bytes that it contains and determines whether that number of bytes is greater than or equal to the number of bytes specified by the high water marker 232 (step 712).

If the receive FIFO 806 is not full (step 710), the receive FIFO 806 determines whether the number of bytes it contains is greater than or equal to the number of bytes specified by the high water marker 232 (step 712). If the number of bytes in the receive FIFO 806 is less than the number of bytes specified by the high water marker 232, the receive FIFO 806 exits the method 700 (step 714). The receive FIFO 806 may leave the idle state if, for example, it receives another message byte over the bus (step 714). If the number of bytes in the FIFO 806 is greater than the number of bytes specified by the high water marker 232, the receive FIFO 806 indicates to the receive processor 802 that the high water mark has been reached (such as by asserting a "high water" interrupt 812 to the processor 802) (step 720).

In response to receiving either the "full" interrupt 810 or the high water interrupt 812, the receive processor 802 retrieves message bytes from the receive FIFO 806 (step 724). The receive processor 802 may, for example, retrieve a predetermined number (e.g., 12) of message bytes from the receive FIFO 806 and then stop retrieving bytes until it is next interrupted by the receive FIFO 806 to retrieve more bytes. Alternatively, the receive processor 802 may, for example, retrieve message bytes from the receive FIFO 806 until the receive FIFO 806 is empty.

After the receive machine 808 writes the next message byte 804 to the receive FIFO 806 (step 706), the receive machine 808 determines whether it has received all bytes in the message (step 716). If it has not, the receive machine 808 receives the next message byte 804 (step 704) and writes it to the receive FIFO 806 (step 706). In this way, the receive machine 808 writes a set of message bytes to the receive FIFO 806 without interrupting the receive processor 802 at least until the receive FIFO 806 becomes filled with the number of bytes specified by the high water mark 232 or the end of the message is in the receive FIFO 806.

If the receive machine 808 determines that all of the message bytes have been received, the receive machine 808 indicates to the send processor that the entire message has been received, such as by sending a "receive complete" message 814 (e.g., checksum byte) to the send machine 608 over the bus 202 (step 718).

In the embodiments described above with respect to FIGS. 3-6, multiple message bytes may be sent/received over the bus 202 by the bus transceiver 270 without interrupting the host processor 238. For example, the host processor 238 may write a stream of message bytes to the send FIFO 214 without being interrupted until the send FIFO 214 is full. The bus controller 208 may transmit a stream of bytes from the send FIFO 214 over the bus 202 without interrupting the host processor 238. Similarly, the transceiver 270 may receive a stream of bytes over the bus 202 without interrupting the host processor 238. The receive machine 808 may write a stream of bytes to the receive FIFO 226 without interrupting the host processor 238 until the receive FIFO 226 reaches the high water mark 232.

The ability to send/receive multiple bytes without interrupting the processor 238 may enable the effective bandwidth of the bus 202 to be increased in comparison to architectures that require the host processor 238 to be interrupted after each byte is sent/received over the bus 202. In particular, empirical testing of a system implementing the techniques disclosed herein in conjunction with an I²C bus has enabled communications over the bus at close its theoretical maximum bandwidth of 400 kHz (40 KB/sec)

Figure 9:
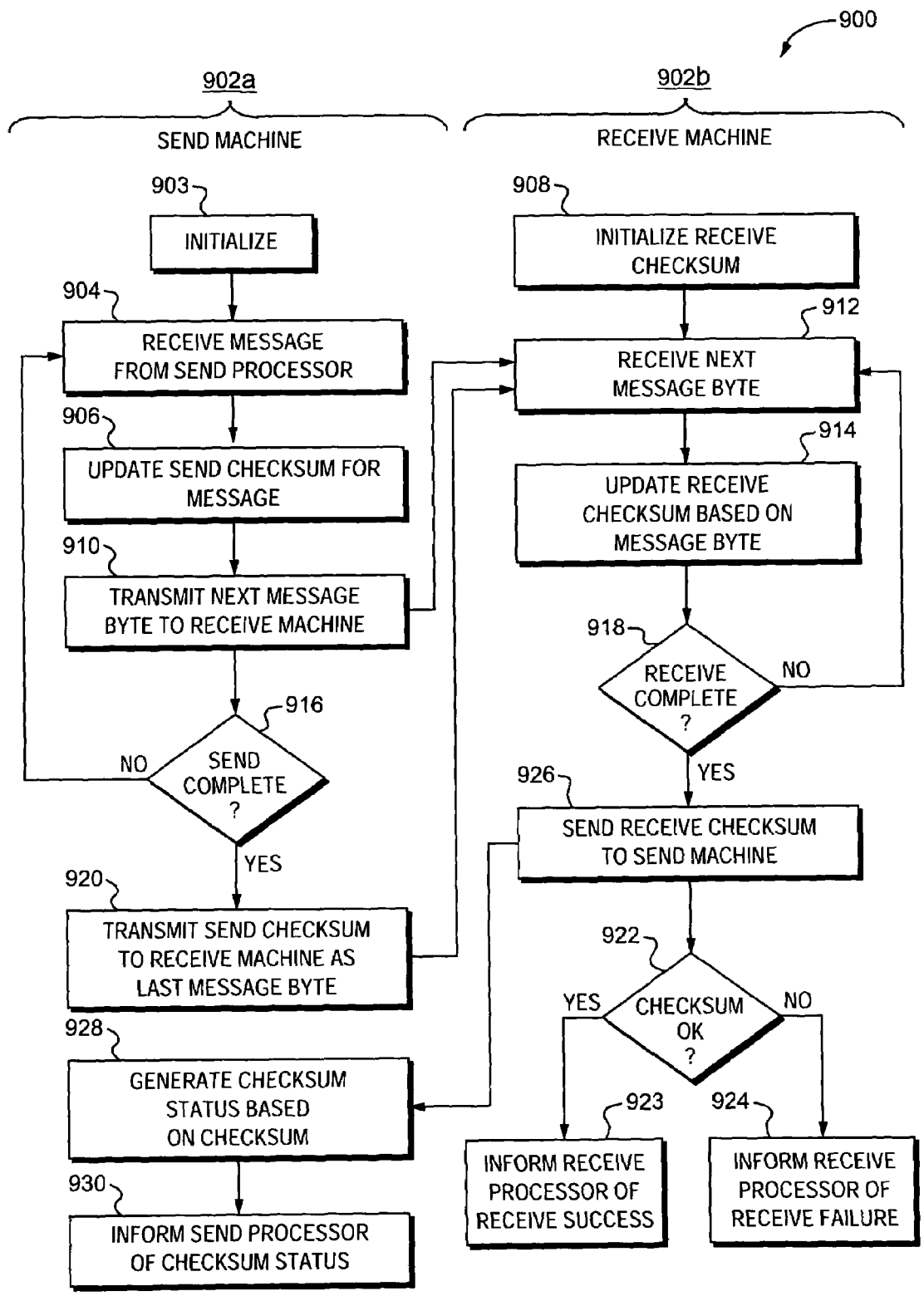
FIG. 9 is flowchart of a method that is used in one embodiment of the present invention to determine whether a message has been transmitted without errors over a communications bus.
Figure 10:
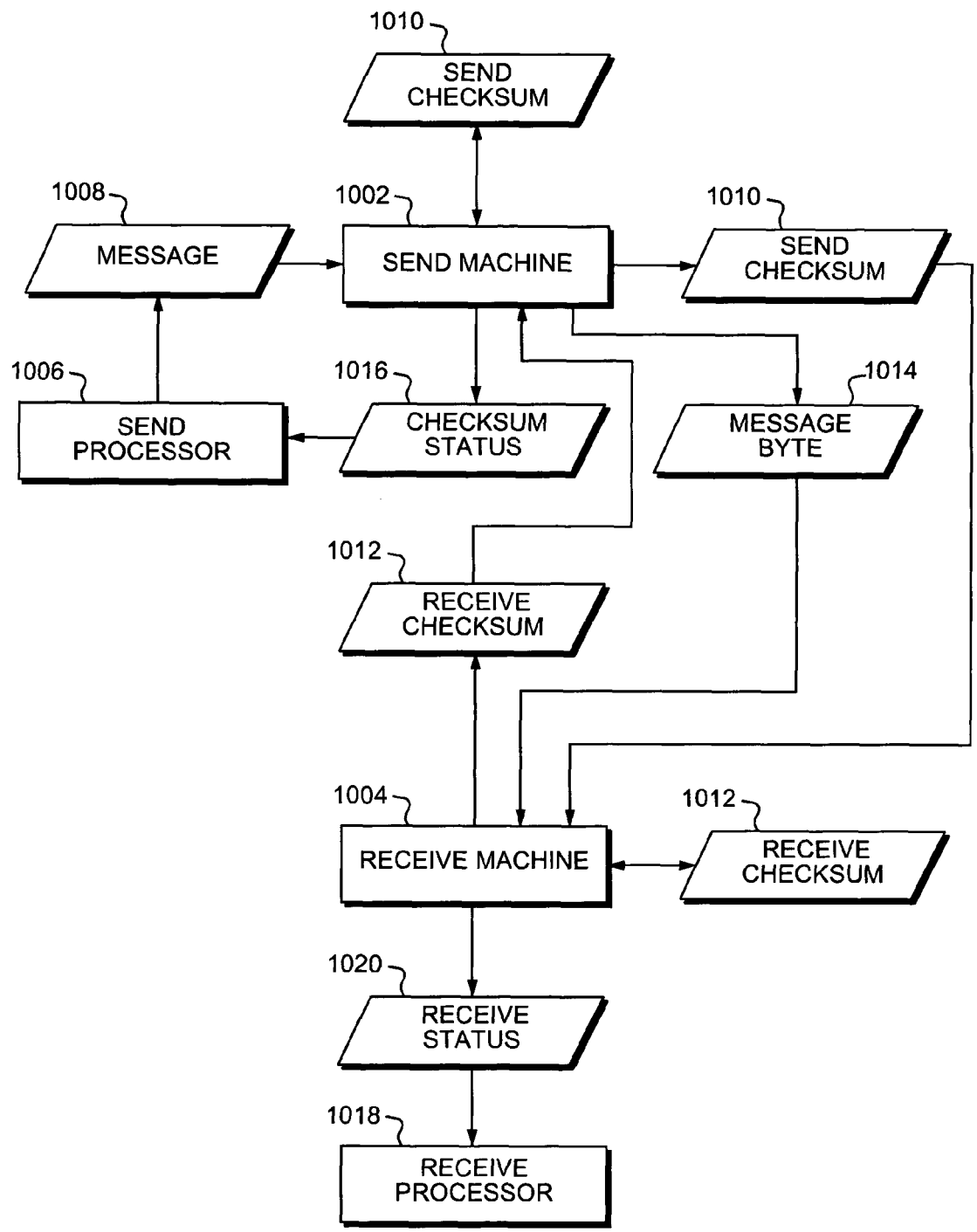
FIG. 10 is a dataflow diagram illustrating the flow of data resulting from performance of the method of FIG. 9 according to one embodiment of the present invention.

In one embodiment of the present invention, the transceiver 270 uses checksums to determine whether messages transmitted over the bus 202 were received without error. Referring to FIG. 9, a flowchart is shown of a method 900 that is used in one embodiment of the present invention to determine whether a message has been transmitted without errors over the bus 202 using a checksum. Referring to FIG. 10, a dataflow diagram is shown illustrating the flow of data resulting from performance of the method 900.

The flowchart of the method 900 shown in FIG. 9 is divided into two columns 902a-b for ease of illustration and explanation. Flowchart elements in column 902a represent actions performed by a send machine 1002 (such as send machine 210), while flowchart elements in column 902b represent actions performed by a receive machine 1004 (such as receive machine 222).

The send machine 1002 is initialized (step 903). When initialized, the send machine 1002 may, for example, initialize a checksum 1010 (referred to as the "send checksum"), reset the master controller 280a, and reset the send FIFO pointer 288. A send processor 1006 (such as the host processor 238) coupled to the send machine 1002 sends a message 1008 to the send machine 1002 for transmission over the bus 202 to the receive machine 1004. For example, as described above, the send processor 1006 may write the message 1008 to the send FIFO 214. The send machine 1002 may then read the next byte of the message 1008 from the send FIFO 214 (step 904) and update the send checksum 1010 based on the value of the message byte (step 906). In one embodiment of the present invention, the send machine 1002 updates the send checksum 1010 by performing a logical XOR operation on the current value of the checksum 1010 and the message byte read in step 904, and using the result as the updated value of the send checksum 1010. The receive machine 1004 maintains its own checksum 1012 (referred to as the "receive checksum") that it initializes (e.g., to zero) prior to processing message bytes from the send machine 1002 (step 908).

The send machine 1002 transmits the first byte 1014 of the message 1008 to the receive machine 1004 over the bus 202 (step 910). The receive machine 1004 receives the messages byte 1014 (step 912) and updates the receive checksum 1012 based on the message byte 1014 (step 914). For example, in one embodiment of the present invention the receive machine 1004 updates the receive checksum 1012 by performing a logical XOR on the receive checksum 1012 and the message byte 1014, and using the result of the XOR operation as the new value for the receive checksum 1012.

If transmission of the message 1008 is not complete (step 916), the send machine 1002 reads the next byte 1014 of the message 1008 from the send FIFO 214 (step 904), updates the value of the send checksum 1012 based on the value of the message byte 1014 (step 906), and transmits the next message byte 1014 over the bus 202 to the receive machine 1004 (step 910). Since reception of the message 1008 is not complete (step 918), the receive machine 1004 receives the next message byte 1014 (step 912), and updates the value of the receive checksum 1012 based on the message byte 1014 (step 914). The remaining bytes in the message 1008 are sent, and the receive checksum 1012 is updated, in this way until transmission and reception of the message 1008 is complete, at which point the send machine 1002 transmits the send checksum 1010 to the receive machine 1004 over the bus 202 as the last byte of the message 1008 (step 920). In other words, the send machine 1002 appends the send checksum 1010 to the message 1008 that is transmitted to the receive machine 1004.

The receive machine 1004 receives the send checksum 1010 (step 912) and updates the value of the receive checksum 1012 based on the value of the send checksum 1010 (step 914). For example, in one embodiment of the present invention the receive machine 1004 updates the receive checksum 1012 in step 924 by performing a logical XOR operation on the receive checksum 1012 and the send checksum 1010, and using the result of the XOR operation as the new value of the receive checksum 1012. In such an embodiment, the receive checksum 1012 will be equal to zero if the message 1008 (including the send checksum 1010) was received by the receive machine 1004 without errors, while the receive checksum 1012 will be non-zero if the message 1008 (including the send checksum 1010) was received by the receive machine 1004 with errors.

The receive machine 1004 sends the receive checksum 1012 to the send machine 1002 (step 926). The send machine 1002 determines whether the receive checksum 1012 indicates that the message 1008 was received by the receive machine 1004 without errors and generates a checksum status message 1016 based on the determination (step 928). The send machine 1002 may perform step 928 by, for example, determining whether the value of the receive checksum 1012 is equal to zero. The send machine 1002 provides the checksum status message 1016 to the send processor 1006 (step 930). Alternatively, the send machine 1002 may omit step 928 and simply forward the receive checksum 1012 to the send processor 1006, which may determine whether the receive checksum 1012 is valid (e.g., by comparing it to zero). In other words, the receive checksum 1012 may perform the function of the checksum status message 1016.

The receive machine 1004 determines whether the receive checksum 1012 is valid (e.g., whether the receive checksum 1012 is equal to zero) (step 922). If the receive machine 1004 determines that the receive checksum 1012 is valid, the receive machine 1004 informs the receive processor 1018 that the message 1008 was received without errors (step 923). Otherwise, the receive machine 1004 informs the receive processor 1018 that the message 1008 was received with errors (step 924). The receive machine 1004 may perform steps 923-924 by, for example, asserting a receive interrupt 1020 to the receive processor 1018 with a status bit that indicates whether the message 1108 was received without errors.

It should be appreciated that in the embodiment illustrated in FIGS. 9-10, the receive checksum 1012 is generated on-the-fly (i.e., while the message 1008 is being received) by the receive machine 1004 rather than by the receive (host) processor 1018 coupled to the receive machine 1004, and without interrupting the receive processor 1018. In this way, the receive checksum 1012 may be generated more quickly than in systems in which the checksum 1012 is generated using software executing on the receive processor 1018.

Furthermore, although the send checksum 1010 and receive checksum 1012 are generated using logical XOR operations in the examples above, this is purely illustrative and does not constitute a limitation of the present invention. Rather, the send checksum 1010 and receive checksum 1012 may be generated in any manner.

Figure 11:
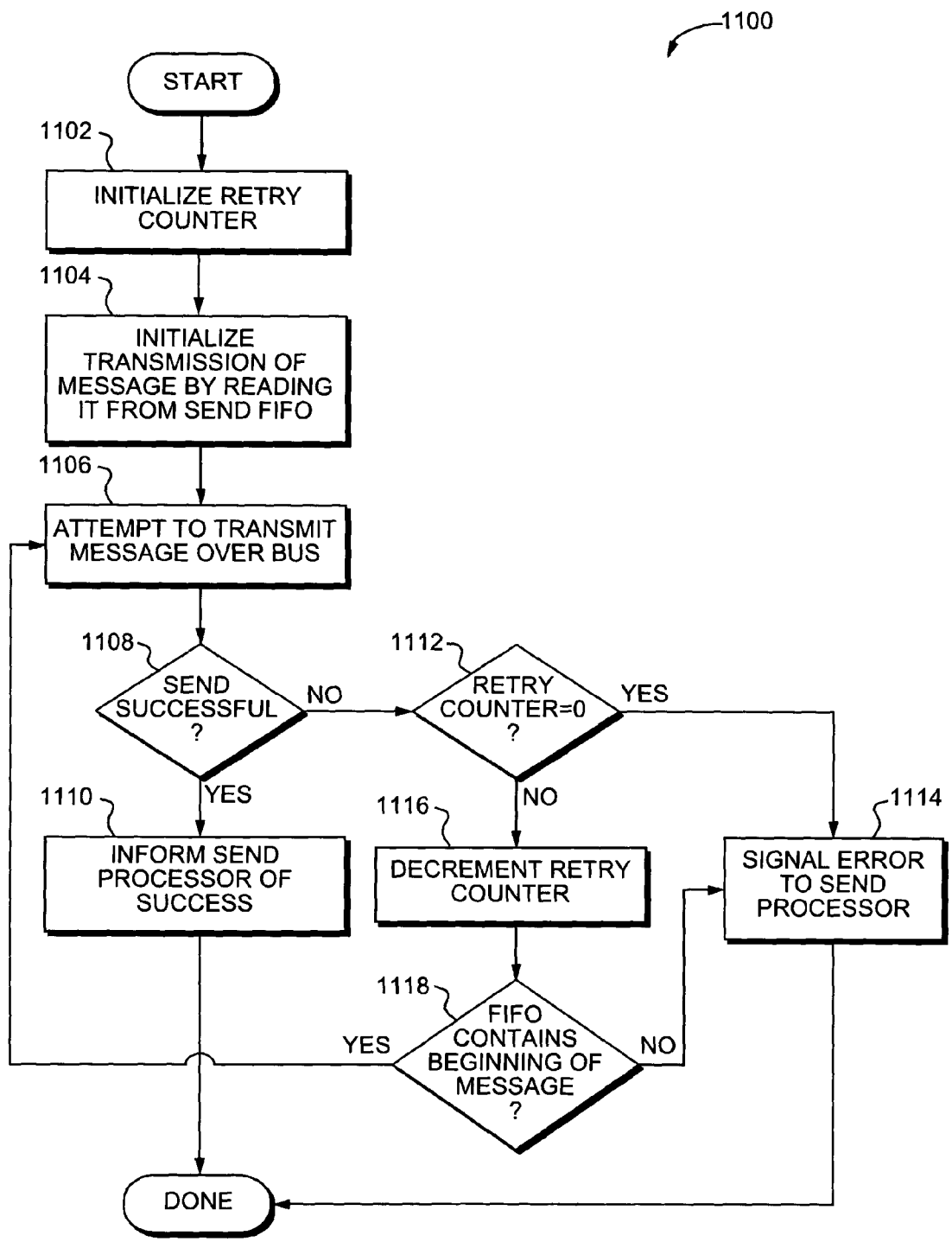
FIG. 11 is a flowchart of a method that is used by the send machine of FIG. 2A to automatically retry message transmissions in one embodiment of the present invention.

In one embodiment of the present invention, the transceiver 270 may automatically attempt to retransmit messages over the bus 202 when initial transmission attempts fail. Referring to FIG. 11, a flowchart is shown of a method 1100 that is used by the send machine 210 in one embodiment of the present invention to automatically retry message transmissions.

The send machine 210 maintains a retry counter 282 that is initialized to a default value (such as 5) (step 1102). The send machine 210 initializes transmission of a message over the bus 202 by reading some or all of the message from the send FIFO 214 (step 1104).

The send machine 210 attempts to transmit the message over the bus 202 (step 1106) and determines whether the message was transmitted successfully (step 1108). The send machine 210 may perform step 1108 in any of a variety of ways. For example, the send machine 210 may use the checksum-based techniques described above with respect to FIGS. 9-10 to determine whether the message was transmitted successfully. If the bus controller 208 did not successfully negotiate for the bus 202 or unexpectedly lost ownership of the bus 202 (a condition referred to as "busloss" in the context of an I²C bus), the bus controller 208 may signal such a condition to the send machine 210, thereby enabling the send machine 210 to determine in step 1108 that the message was not transmitted successfully. If the bus controller 208 targeted a device that was not present or not operating on the bus 202 (a condition referred to as "slave NAK" in the context of an I²C bus), the bus controller 208 may signal such a condition to the send machine 210, thereby enabling the send machine 210 to determine in step 1108 that the message was not transmitted successfully.

If the message was transmitted successfully, the send machine 210 reports the success to the host processor 238 (step 1110) and the method 1100 is complete. If the message was not transmitted successfully, the send machine 210 determines whether the retry counter 282 is equal to zero (step 1112). If the retry counter 282 is equal to zero, then the send machine 210 has tried unsuccessfully to transmit the message the maximum permissible number of times, and the send machine signals an error to the processor 238 (step 1114).

If the retry counter 282 is not equal to zero, the send machine 210 decrements the retry counter 282 (step 1116). The send machine 210 determines whether the beginning of the message is still in the send FIFO 214 (step 1118). If the beginning of the message is still in the send FIFO 214, the send machine 210 attempts to transmit the message again (step 1106). If the beginning of the message is not still in the send FIFO 214, the send machine 210 cannot attempt to retransmit the message without obtaining it from the processor 238, and the send machine 210 signals an error to the processor 238 (step 1114). In response, the processor 238 may write the message to the send machine 210 again, or take any other appropriate action.

According to the I²C specification, when two bus controllers simultaneously attempt to gain ownership of the bus 202, the first device to drive a unique logic low on the bus 202 wins ownership of the bus 202. The device that does not win ownership of the bus 202 will then monitor the bus 202, looking for the "busfree" condition, signified by a rising edge on the data line 206 with the clock line 204 held high. The device that wins ownership of the bus 202 will continue mastering the bus 202 until its transaction is completed. When a device detects the busfree condition, a timer in the device begins counting down from a pre-designated timeout, typically set by firmware in the device. For example, the timeout value may be stored in the busfree count register 236a in the register interface. When the timer elapses, the device will again attempt to obtain ownership of the bus 202 to perform its pending transaction.

In such an architecture it is possible for one device to repeatedly gain ownership of the bus 202 and thereby starve out other devices connected to the bus 202. For example, the device with the lowest address may always gain ownership of the bus if the message protocol used on the bus 202 places the sending device's address at or near the beginning of the messages that are used to request bus ownership.

In one embodiment of the present invention this problem is addressed by using the fair arbitration block 272, which receives the contents of the busfree count register 236a via signals 274, modifies the value, and provides a modified busfree count value to the bus controller using signals 276. By modifying the value of the busfree count register 236a appropriately, the likelihood that one device will starve out other devices on the bus 202 may be reduced or even eliminated.

Figure 12:
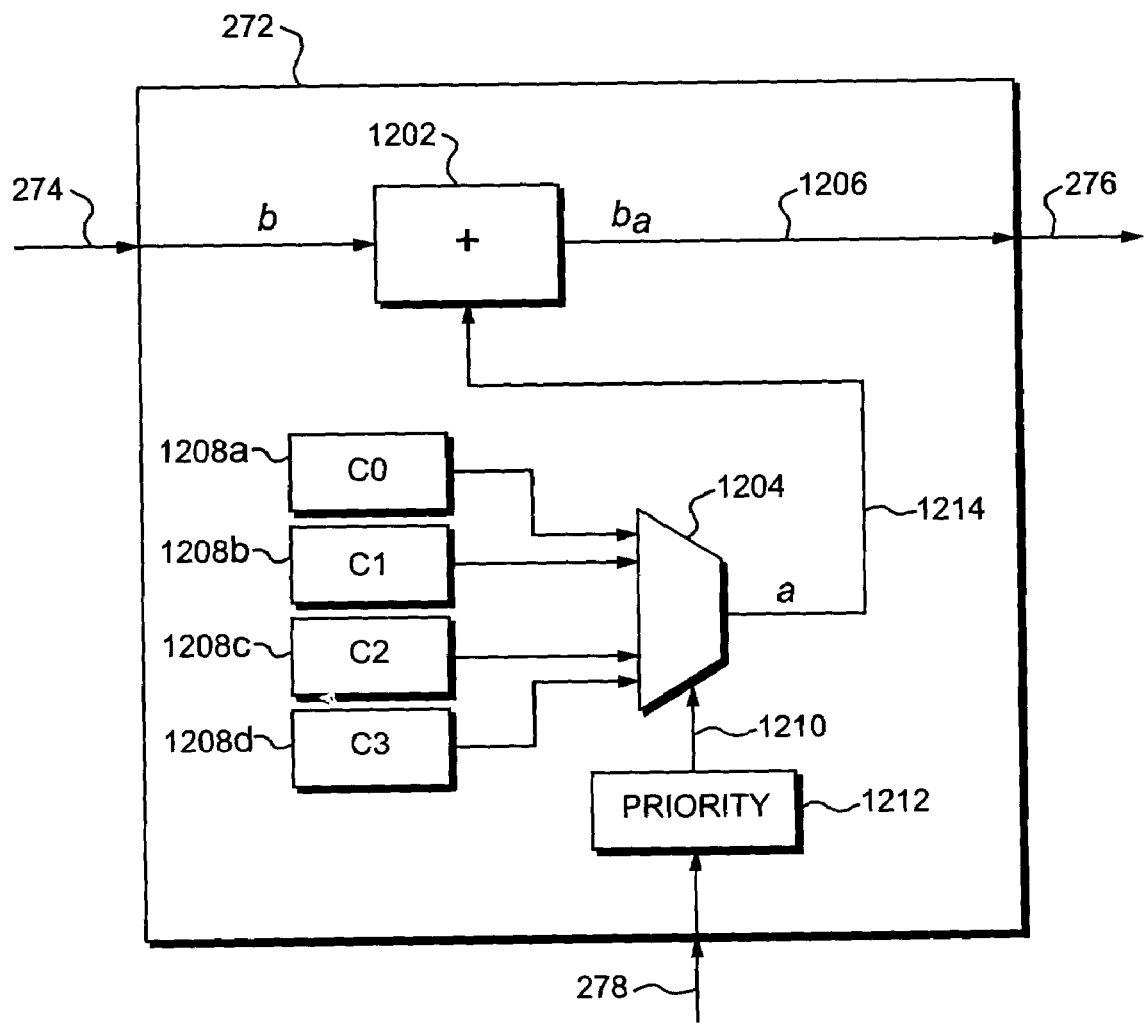
FIG. 12 is a schematic diagram of the fair arbitration block of FIG. 2A according to one embodiment of the present invention.

Referring to FIG. 12, a schematic diagram is shown of the fair arbitration block 272 according to one embodiment of the present invention. The particular components shown in FIG. 12 are illustrated merely for purposes of example and do not constitute a limitation of the present invention. The fair arbitration block 272 receives the value b of the busfree count register 236a via signals 274. The fair arbitration block 272 includes an adder 1202 that receives the value b and adds to it a value a output by a multiplexer 1204 on line 1214, thereby producing an arbitrated busfree count value $b_a$ (equal to b+a) on line 1206. The value $b_a$ is output by the fair arbitration block 272 using signals 276.

The value a that is added to the busfree count b is produced as follows. The data inputs of the multiplexer 1204 are coupled to four predetermined constants 1208a-d, respectively. The constants 1208a-d may be chosen in any manner, such as by empirical testing to determine which choice of values most reduces the likelihood that any device will dominate the bus 202.

The selection input of the multiplexer 1204 receives a priority value on line 1210 from a priority block 1212. The priority block 1212 outputs the values 0, 1, 2, and 3 in a round-robin fashion. Assume, for purposes of example, that the priority block 1212 is initialized to output the value 0 on line 1210, thereby causing the multiplexer 1204 to select constant 1208a for output on line 1214.

Priority block 1212 is coupled to send machine 210 by line 278. When line 278 is asserted, priority block 1212 increments its output in a round-robin fashion, from 0 to 1, from 1 to 2, from 2 to 3, or from 3 to 0, thereby causing the output 1214 of multiplexer 1204 to cycle through the values of constants 1208a-d in a round-robin fashion.

The send machine 210 may assert line 278 upon the occurrence of any of a variety of events. For example, in one embodiment of the present invention, the send machine 210 asserts line 278 when the send machine 210 signals any interrupt to the host processor 238 that indicates that transmission of a message has completed, whether successfully, with an error, or as the result of a retry. This particular method of generating the rotate signal on line 278 is merely an example and is not a limitation of the invention. Rather, the rotate signal may be asserted on line 278 in any manner and by the send machine 210 or any other component.

As mentioned above, the transceiver 270 includes a byte timer 260. The byte timer 260 may, for example, be used to cause the host processor 238 to relinquish ownership of the bus 202 if the host processor 238 crashes while it has ownership of the bus 202. For instance, if the host processor 238 were to crash and then receive an interrupt from the receive FIFO 226 indicating that the receive FIFO 226 was full, the host processor 238 would be unable to service the interrupt and the receive FIFO 226 would continue to fill with message bytes. Upon becoming full, the receive FIFO 226 could stall the bus 202 while waiting indefinitely to be emptied by the host processor 238. The byte timer 260 may be set to take a predetermined action, such as flushing the receive FIFO 226 and/or releasing ownership of the bus 202 from the bus controller 208, if the host processor 238 becomes unable to communicate for more than a predetermined amount of time. Techniques that may be employed in conjunction with the byte timer 260 are disclosed in more detail in the above-referenced patent application entitled "Detecting and Diagnosing a Malfunctioning Host Coupled to a Communications Bus."

Having described techniques that may be applied in general to send an receive messages in accordance with embodiments of the present invention, examples of techniques for sending and receiving messages over an I²C bus according to embodiments of the present invention will now be described.

Figure 13:
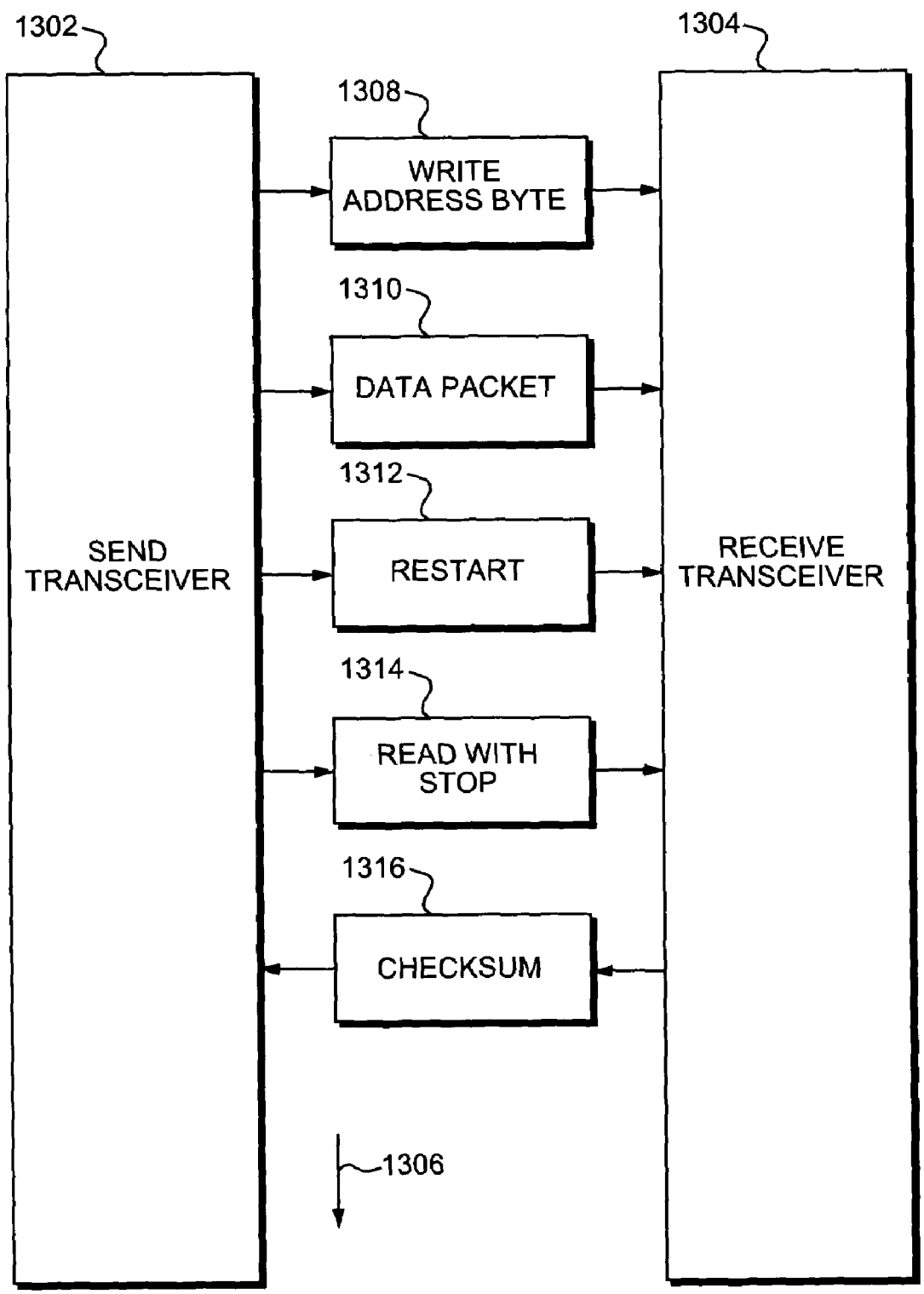
FIG. 13 is a dataflow diagram illustrating the flow of data between a send transceiver and a receive transceiver over a communications bus in accordance with a communications protocol employed in one embodiment of the present invention.

Referring to FIG. 13, a dataflow diagram is shown illustrating the flow of data between a send transceiver 1302 and a receive transceiver 1304 over the bus 202 in accordance with a message transmission protocol employed in one embodiment of the present invention in which the bus 202 is an I²C bus. The send transceiver 1302 and receive transceiver 1304 may, for example, be implemented in accordance with the design of the transceiver 270 shown in FIG. 2A. All transactions illustrated in FIG. 13 occur over the bus 202 (FIG. 2A). Furthermore, transactions illustrated in FIG. 13 occur in the chronological order indicated by arrow 1306. In other words, the diagram shown in FIG. 13 should be read from the top down.

The protocol illustrated by FIG. 13 transmits and receives a single packet of data over the bus 202. Multi-packet messages may be transmitted and received over the bus 202 by repeating the actions illustrated by FIG. 13 as necessary. Messages that are longer than the maximum packet size may be divided into multiple packets (e.g., by a software device driver) using techniques well-known to those of ordinary skill in the art.

The send transceiver 1302 initiates a message transmission by sending a "write" address byte 1308 to the receive transceiver 1304. In other words, the write address byte is encoded as a "write" command according to the I²C specification. The send transceiver 1302 transmits a packet of data 1310 to the receive transceiver 1304.

The send transceiver 1302 transmits an I²C "restart" command 1312 to the receive transceiver 1304 after sending the last byte in the data packet 1310. This indicates to other devices on the bus 202 that the send transceiver 1302 will be issuing a new command.

The send transceiver 1302 sends an address byte to the receive transceiver 1304 encoded as an I²C "read with stop" command 1314, indicating that the send transceiver 1302 is requesting a single byte from the receive transceiver 1304. The receive transceiver 1304 responds to the "read with stop" command 1314 by returning a single checksum byte 1316. Techniques that may be used to generate the checksum byte 1316 are described above with respect to FIGS. 9-10. Transmission of the checksum byte 1316 completes the transaction between the send transceiver 1302 and receive transceiver 1304.

Techniques for sending a message over the bus 202 were described above with respect to FIGS. 3-6. Particular techniques that may be employed by the host processor 238 and send machine 210 to perform various steps of the method 500 shown in FIG. 5 when the bus 202 is an I²C bus will now be described.

Prior to initiation of a send transaction (i.e., prior to step 504), the processor 238 may service and/or clear any pending interrupts so that no interrupts are pending when the send transaction begins. The processor 238 may set the target address for the message (e.g., the address of the receive transceiver 1304) by storing the target address in a target address register 236b in the register interface 236. The target address register 236b may be coupled over the status interface 250 to a corresponding target address register (not shown) in the bus controller 208, which may use the target address set by the processor 238 as the target address of the message to be transmitted over the bus 202 in accordance with the I²C protocol, using techniques that are well-known to those of ordinary skill in the art.

The processor 238 may write the data (payload) of the message to a send data register 236c of the register interface 236. Although not shown in FIG. 2A, the input to the send data register 236c may also be connected to the bus 252 connected to the send FIFO 214, so that writing the message payload to the send data register 236c simultaneously transfers the payload to the send FIFO 214, where the payload is stored as it is written by the processor 238. The processor 238 continues to write the payload to the FIFO 214 until the FIFO 214 is full (steps 504-508 of method 500 in FIG. 5) or until the end of the message has been stored in the FIFO 214 (step 510 of method 500 in FIG. 5).

Upon filling the FIFO 214 or storing the end of the message in the FIFO 214, the processor 238 writes the length of the full message (not merely the portion of the message currently stored in the FIFO 214) in the register interface 236 by first storing the high byte of the message length in a send message length high register 236d and then storing the low byte of the message length in a send message length low register 236e.

The send machine 210 monitors the contents of the high and low message length registers 236d-e using control/status signals 254. When the send machine 210 detects a change in the value of the send message length low register 236e, the send machine 210 begins to transmit the contents of the FIFO 214 over the bus 202, as described in more detail below with respect to step 520 of method 500. In this way, the process of writing the send message length low register 236e performs the function of instructing the send machine 210 to begin transmitting the message (step 518 in FIG. 5).

The register interface 236 may include a send interrupt/enable register 236f that is used, for example, by the send machine 210 to signal interrupts to the host processor 238. The send interrupt/enable register 236f may include various bits, each of which may signal a distinct interrupt to the host processor. For example, the send interrupt/enable register 236f may include a "Send FIFO Almost Empty" bit (not shown) that the send machine 210 asserts (e.g., sets to a high logical value) when the send FIFO 214 reaches the low water mark 220 (steps 524-526 in method 500).

In general, when the processor 238 is interrupted by a send interrupt signaled by the contents of the send interrupt/enable register 236f, the processor 238 may determine which bits in the register 236f are set and thereby determine which interrupts have been signaled by the send machine 210. If, for example, the "Send FIFO Almost Empty" bit is set, the processor 238 may determine that the send FIFO 214 has reached the low water mark 220 and write more message bytes to the send FIFO 214 in response (steps 510 and 504 in method 500). Similarly, the send interrupt/enable register 236f may include a "Send FIFO Full" bit that is set by the send machine 210 to indicate to the processor 238 that the send FIFO 214 is full (step 514 of method 500).

The register interface 236 may also include a send error/status register 236g that may contain bits indicating which errors, if any, occurred while attempting to send a message. When interrupted by the send machine 210 (as in, for example, step 1114 of method 1100 shown in FIG. 11), the processor 238 may read the contents of the send error/status register 236g to determine which errors, if any, occurred during message transmission.

The register interface 236 may also include a processor checksum register 236i that performs the function of the send checksum 1010 shown in FIG. 10 and a send received checksum register 236*h* that performs the function of the receive checksum 1012 shown in FIG. 10.

Figure 14:
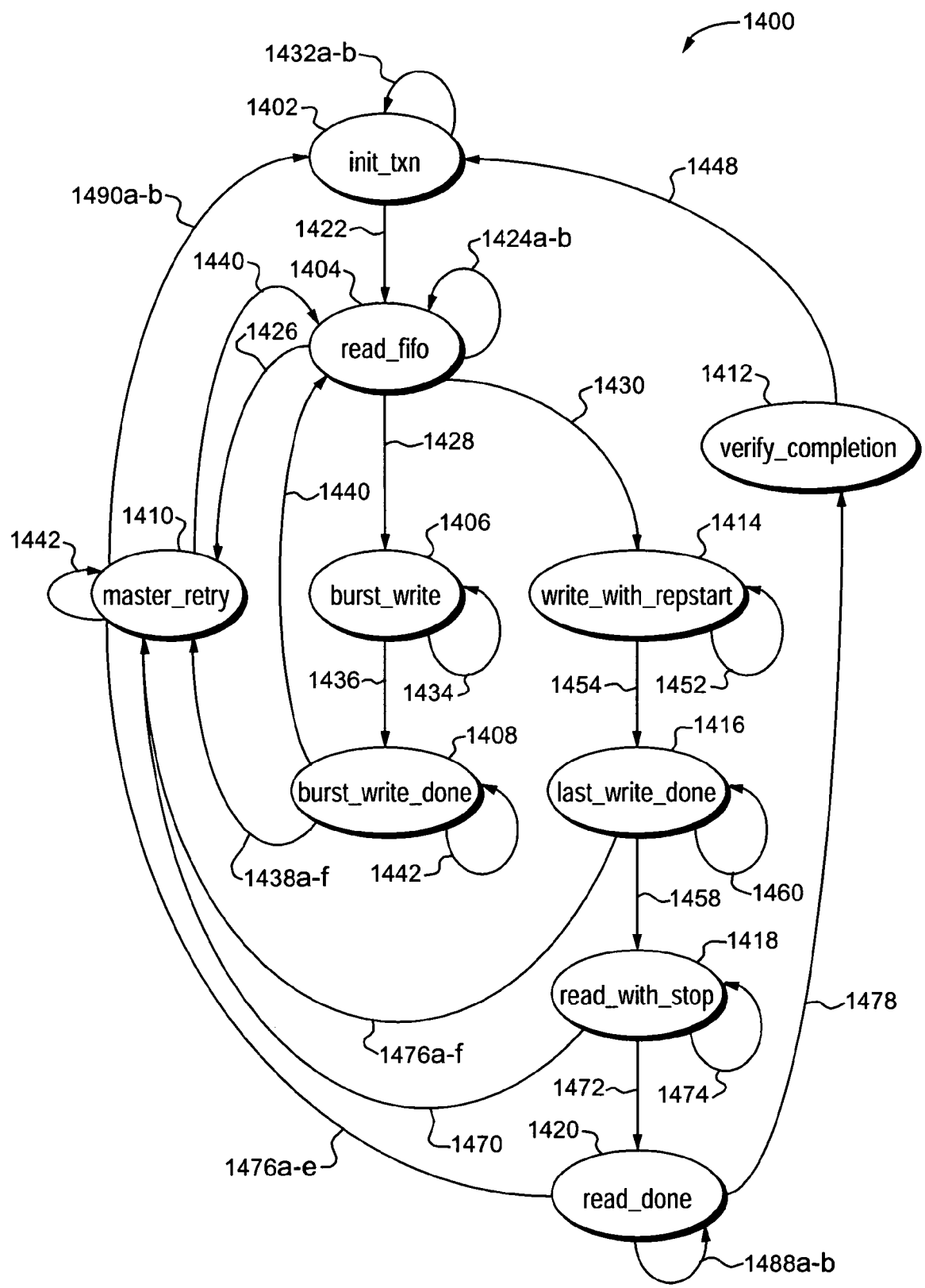
FIG. 14 is a finite state machine diagram illustrating a finite state machine implemented by the send machine of FIG. 2A according to one embodiment of the present invention.

Examples of particular techniques that may be employed by the send machine 210 to perform steps 520 and 522 of method 500 when the bus 202 is an I²C bus will now be described. Referring to FIG. 14, a finite state machine diagram 1400 is shown illustrating a finite state machine implemented by the send machine 210 according to one embodiment of the present invention. Connections between states in diagram 1400 are illustrated and referred to by numbered arcs, such as arc 1422. For ease of illustration, multiple arcs connecting the same pair of states are illustrated by a single arc with multiple reference numerals (such as arcs 1490*a-b*) rather than by multiple arcs.

Upon reset of the send machine 210, the send machine 210 resets the master bus controller 280*a*. The send machine 210 then transitions to state init_txn 1402. Upon receiving a "begin send" message (such as the message 418 in FIG. 4 or the message 612 in FIG. 6) from the host processor 238, the send machine 210 transitions into state read_fifo 1404 (arc 1422). If the send machine 210 is in state init_txn 1402 and the byte timer 260 signals a byte timeout, the send machine 210 resets the master bus controller 280*a* and remains in state init_txn 1402 (arc 1432*a*). If the send machine 210 is in state init_txn 1402 and none of the above-described conditions exist, the send machine 210 takes no action and remains in state init_txn 1402 (arc 1432*b*).

If the send machine 210 is in state read_fifo 1404 and the send FIFO 214 is empty, the send machine 210 sends a "FIFO empty" interrupt to the host processor 238 (e.g., by asserting the "Send FIFO Empty" bit in register 236*f*) and remains in state read_FIFO 1404 (arc 1424*a*).

If the send machine 210 is in state read_fifo 1404 and the byte timer 260 signals a byte timeout, the send machine 210 resets the master bus controller 280*a*, asserts a byte timeout interrupt to the host processor 238, and transitions to a state master_retry 1410 (arc 1426).

If the send machine 210 is in state read_fifo 1404 and the bus controller 208 is ready for a command request and the next byte in the send FIFO 214 is not the last byte in the message being transmitted, the send machine 210 reads the next byte from the send FIFO 214 and transitions to state burst_write 1406 (arc 1428). If the send machine 210 is in state read_fifo 1404 and the master bus controller 280*a* is ready fro a command request and the next byte in the send FIFO 214 is the last byte in the message being transmitted, the send machine 210 reads the next message byte from the send FIFO 214 and transitions to state write_with_repstart 1414 (arc 1430). If the send machine 210 is in state read_fifo 1404 and none of the above-described conditions exist, the send machine 210 takes no action and remains in state read_fifo 1404 (arc 1424*b*).

If the send machine 210 is in state burst_write 1406 and the master bus controller 280*a* has not completed sending the byte that it has read from the send FIFO 214, the send machine 210 remains in state burst_write (arc 1434). If the send machine 210 is in state burst_write 1406 and the master bus controller 280*a* has completed reading the byte from the send FIFO 214, the send machine 210 instructs the bus controller 208 to transmit the byte on bus 202 and transitions to state burst_write_done 1408 (arc 1436).

If the send machine 210 is in state burst_write_done 1408 and the byte timer 260 signals a timeout, the send machine 210 resets the master bus controller 280*a*, asserts a byte timeout interrupt to the host processor 238, and transitions to state master_retry 1410 (arc 1438*a*). If the send machine 210 is in state burst_write_done 1408 and the bus controller 208 indicates to the send machine 210 that the byte transmission has completed without errors, the send machine 210 signals an acknowledgement to the bus controller 208 using control/status signals 212 and transitions to state read_fifo 1404 (arc 1440).

The send FIFO 214 may include a pointer 288 that points to the location in the send FIFO 214 to which the next byte received from the processor 238 should be written. Furthermore, in the embodiment illustrated by FIG. 14, the retry counter 282 is initialized to zero and incremented until it reaches a predetermined retry limit, rather than being initialized to the retry limited and decremented to zero as illustrated in FIG. 11.

If the send machine 210 is in state burst_write_done 1408 and the master bus controller 280*a* indicates to the send machine 210 that the master bus controller 280*a* experienced a busloss condition while the beginning of the message is still in the send FIFO 214, the send machine 210 logs the busloss condition, sends an acknowledgement of the busloss condition to the bus controller 208, clears the send FIFO pointer 288, increments the retry count, and transitions to state master_retry 1410 (arc 1438*b*).

If the send machine 210 is in state burst_write_done 1408 and the bus controller 208 indicates to the send machine 210 that the bus controller 208 experienced a busloss condition while the beginning of the message is no longer in the send FIFO 214, the send machine 210 asserts retry and busloss interrupts to the host processor 238 (using register 236*f*), clears the send FIFO pointer 288, resets the retry count 282, and transitions to state master_retry 1410 (arc 1438*c*).

If the send machine 210 is in state burst_write_done 1408 and the bus controller 208 indicates to the send machine 210 that the bus controller 208 experienced a slave NAK condition while the beginning of the message is still in the send FIFO 214, the send machine 210 logs the NAK condition, sends an acknowledgement of the NAK condition to the master bus controller 280*a*, clears the send FIFO pointer 288, increments the retry count 282, and transitions to state master_retry 1410 (arc 1438*d*).

If the send machine 210 is in state burst_write_done 1408 and the master bus controller 280*a* indicates to the send machine 210 that the master bus controller 280*a* experienced a slave NAK condition while the beginning of the message is no longer in the send FIFO 214, the send machine 210 asserts retry and NAK interrupts to the host processor 238, clears the send FIFO pointer 288, resets the retry count 282, and transitions to state master_retry 1410 (arc 1438*e*).

If the send machine 210 is in state burst_write_done 1408 and the master bus controller 280*a* indicates to the send machine 210 that the master bus controller 280*a* experienced both a bussloss and NAK condition, the send machine 210 sends a fault interrupt to the host processor 238, resets the master bus controller 280*a*, resets the retry count 282, and transitions to state master_retry 1410 (arc 1438*f*).

If the send machine 210 is in state burst_write_done 1408 and none of the above-described conditions exist, the send machine 210 takes no action and remains in state burst_write_done 1408 (arc 1442).

If the send machine 210 is in state write_with_repstart 1414 and the master bus controller 208*a* is not finished reading bytes from the send FIFO 214, the send machine 210 waits for the FIFO read to complete by remaining in state write_with_repstart 1414 (arc 1452). If the send machine 210 is in state write_with_repstart 1414 and the master bus controller 280*a* is finished reading bytes from the send FIFO 214, the send machine instructs the bus controller 208 to transmit a "repeated start" command after the last message byte, and transitions to state last_write_done 1416 (arc 1454).

If the send machine 210 is in state last_write_done 1416 and the byte timer 260 signals a timeout, the send machine 210 asserts a byte timeout interrupt to the host processor 238, resets the master bus controller 280a, and transitions to state master_retry 1410 (arc 1456a). If the send machine 210 is in state last_write_done 1416 and the master bus controller 280a indicates that the byte was successfully transmitted in its entirety with no errors, the send machine 210 signals an acknowledgement to the master bus controller 280a and transitions to state read_with_stop 1418 (arc 1458).

If the send machine 210 is in state last_write_done 1416 and the master bus controller 280a indicates that it experienced a busloss condition while the beginning of the message is still in the send FIFO 214, the send machine 210 logs the busloss condition, signals an acknowledgement of the busloss condition to the master bus controller 280a, clears the send FIFO pointer 288, increments the retry count 282, and transitions to state master_retry 1410 (arc 1456b). If the send machine 210 is in state last_write_done 1416 and the bus controller 238 indicates that it experienced a busloss condition while the beginning of the message is no longer in the send FIFO 214, the send machine 210 asserts retry and busloss interrupts to the host processor 238, clears the send FIFO pointer 288, resets the retry count 282, and transitions to state master_retry 1410 (arc 1456c).

If the send machine 210 is in state last_write_done 1416 and the bus controller 238 indicates that it experienced a slave NAK condition while the beginning of the message is still in the send FIFO 214, the send machine 210 logs the NAK condition, signals an acknowledgement of the NAK condition to the bus controller 208, clears the send FIFO pointer 288, increments the retry count 282, and transitions to state master_retry 1410 (arc 1456d). If the send machine 210 is in state last_write_done 1416 and the bus controller 238 indicates that it experienced a slave NAK condition while the beginning of the message is no longer in the send FIFO 214, the send machine 210 asserts retry and NAK interrupts to the host processor 238, clears the send FIFO pointer 288, resets the retry count 282, and transitions to state master_retry 1410 (arc 1456e).

If the send machine 210 is in state last_write_done 1416 and the master bus controller 208a indicates that it experienced both busloss and slave NAK conditions, the send machine 210 asserts a fault interrupt to the host processor 238, resets the master bus controller 280a, resets the retry count 282, and transitions to state master_retry 1410 (arc 1456f). If the send machine 210 is in state last_write_done 1416 and none of the above-described conditions exist, the send machine 210 takes no action and remains in state last_write_done 1416 (arc 1460).

If the send machine 210 is in state read_with_stop 1418 and the byte timer 260 signals a byte timeout, the send machine 210 asserts a fault interrupt, resets the master bus controller 280a, resets the retry count 282, and transitions to state master_retry (arc 1470). If the send machine 210 is in state read_with_stop 1418 and the bus controller indicates to the send machine 210 that the master bus controller 280a is ready to receive message bytes, the send machine 210 continues asserting "read with stop" to the master bus controller 280a and transitions to state read_done 1420 (arc 1472). The send machine 210 and master bus controller 280a may, for example, each include a "read" and "stop" control signals. The send machine's "read" signal may be coupled to the bus controller's "read" signal, and the send machine's "stop" signal may be coupled to the bus controller's "stop" signal.

The send machine 210 may assert "read with stop" by asserting both its "read" and "stop" signals. If the send machine 210 is in state read_with_stop 1418 and none of the above-described conditions exist, the send machine 210 continues asserting "read with stop" to the bus controller 208 and remains in state read_with_stop 1418 (arc 1474).

If the send machine 210 is in state read_done 1420 and the byte timer 260 signals a byte timeout, the send machine 210 asserts a byte timeout interrupt, resets the master bus controller 280a, resets the retry count 282, and transitions to state master_retry (arc 1476a). If the send machine 210 is in state read_done 1420 and the master bus controller 280a indicates that the checksum byte has been read from the addressed slave without errors, the send machine 210 asserts a "transaction successful" interrupt to the host processor 238, resets the retry count 282, signals an acknowledgement to the bus controller 208, and transitions to state verify_completion 1412 (arc 1478).

If the send machine 210 is in state read_done 1420 and the master bus controller 280a indicates that it has experienced a busloss condition, the send machine 210 asserts a fault interrupt, resets the master bus controller 280a, resets the retry count 282, and transitions to state master_retry 1410 (arc 1476b).

If the send machine 210 is in state read_done 1420 and the master bus controller 280a indicates that it encountered a slave NAK condition while the beginning of the message is still in the send FIFO 214, the send machine 210 logs the NAK condition, signals an acknowledgement of the NAK condition to the master bus controller 280a, clears the send FIFO pointer 288, increments the retry count 282, and transitions to state master_retry 1410 (arc 1476c). If the send machine 210 is in state read_done 1420 and the master bus controller 208a indicates that it encountered a slave NAK condition while the beginning of the message is no longer in the send FIFO 214, the send machine 210 asserts retry and NAK interrupts to the host processor 238, clears the send FIFO pointer 288, resets the retry count 282, and transitions to state master_retry 1410 (arc 1476d).

If the send machine 210 is in state read_done 1420 and the master bus controller 280a indicates that it experienced both busloss and NAK conditions, the send machine 210 asserts a fault interrupt to the host processor 238, resets the master bus controller 280a, resets the retry count 282, and transitions to state master_retry 1410 (arc 1476e). If the send machine 210 is in state read_done 1420 and none of the above-described conditions exist, the send machine 210 continues asserting "read with stop" to the master bus controller 280a and remains in state read_done 1416 (arc 1488a).

If the send machine 210 is in state verify_completion 1412, the send machine 210 clears the send FIFO 214, clears the retry count 282, indicates that the value of the received checksum register 236h is valid to the host processor 238, and returns to state init_txn 1402 (arc 1488b).

If the send machine 210 is in state master_retry 1410 and the retry count 282 has been cleared (e.g., is equal to zero), the send machine 210 asserts a "message fail" interrupt to the host processor 238, clears the send FIFO 214, and returns to state init_txn 1402 (arc 1490a). If the send machine 210 is in state master_retry 1410 and the retry count 282 is less than the retry limit, the send machine 210 takes no action and transitions to state read_fifo 1404 (arc 1440) to retry the message. Finally, if the send machine 210 is in state master_retry 1410 and the retry count 282 exceeds the retry limit, the send machine 210 asserts a "message fail" interrupt, clears the send FIFO 214, and returns to state init_txn 1402 (arc 1490b).

Techniques for receiving a message over the bus 202 were described above with respect to FIGS. 7-10. Particular techniques that may be used to perform methods 700 and 900 when the bus 202 is an I²C bus will now be described.

The register interface 236 may include a receive interrupt/enable register 236*j* that is used, for example, by the receive machine 222 to signal interrupts to the host processor 238. The receive interrupt/enable register 236*j* may include various bits, each of which may signal a distinct interrupt to the host processor. For example, the send interrupt/enable register 236*f* may include a "Message Receive Success" bit (not shown) that the receive machine 222 asserts (e.g., sets to a high logical value) when receive machine 222 has received an entire message without errors (step 718 in method 700).

In general, when the processor 238 is interrupted by a receive interrupt signaled by the contents of the receive interrupt/enable register 236*j*, the processor 238 may determine which bits in the register 236*j* are set and thereby determine which interrupts have been signaled by the receive machine 222. If, for example, the "Message Receive Success" bit is set, the processor 238 may determine that an entire message has been received without errors. Upon a receive interrupt, the processor 238 may also read the receive status/error register 236*k* to obtain additional information, if any, about the interrupt.

Figure 15:
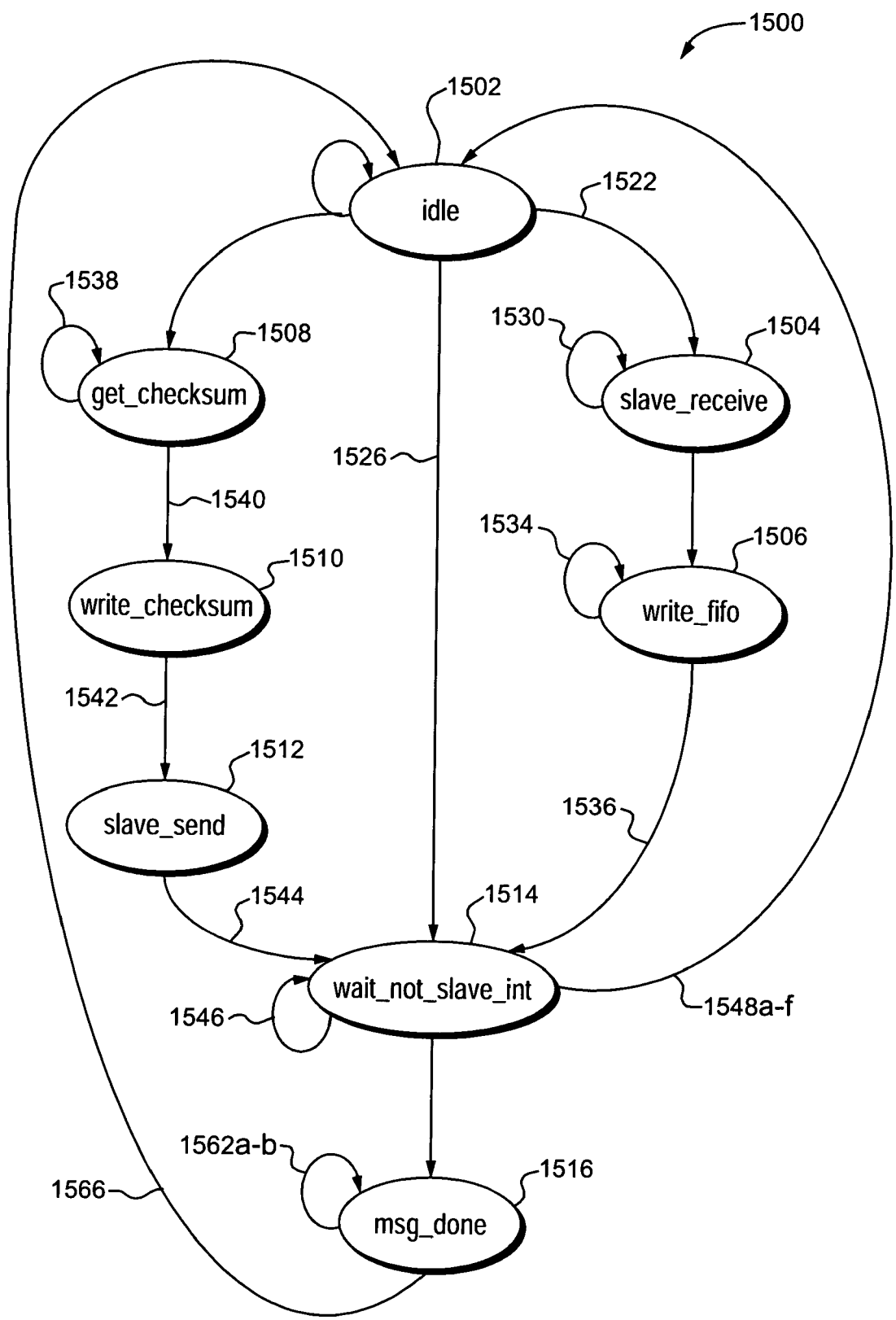
FIG. 15 is a finite state machine diagram illustrating a finite state machine implemented by the receive machine of FIG. 2A to receive messages over a communications bus according to one embodiment of the present invention.

Particular techniques that may be used to perform method 700 when the bus 202 is an I²C bus will now be described. Referring to FIG. 15, a finite state machine diagram 1500 is shown illustrating a finite state machine implemented by the receive machine 222 according to one embodiment of the present invention. The receive FIFO 226 may include a pointer 290 that points to the location in the receive FIFO 226 to which the next byte received over the bus 202 should be written. Upon reset of the receive machine 222, the slave bus controller 280*b* is reset and the receive FIFO write pointer 290 is reset.

The receive machine 222 begins in an idle state 1502. If the receive machine 222 is in state idle 1502 and the byte timer 260 signals a byte timeout while the receive machine 222 is not being addressed as a slave (such as when another slave device on the bus 202 is being addressed) the receive machine 222 resets the slave bus controller 280*b* and remains in state idle 1502 (arc 1518*a*). If the receive machine 222 is in state idle 1502 and the byte timer 260 signals a byte timeout while the receive machine 222 is being addressed as a slave, the receive machine 222 asserts a byte timeout interrupt to host processor 238, resets the slave bus controller 280*b*, clears the receive FIFO write pointer 290, and remains in state idle 1502 (arc 1518*b*).

If the receive machine 222 is in state idle 1502 and the slave bus controller 280*b* indicates that it is being addressed for a byte write (that is, the slave bus controller 280*b* is being written to by a master device) the receive machine 222 initiates a read cycle from the (slave) bus controller 280*b* and transitions to state slave_receive 1504 (arc 1522).

As described above, the receive machine 222 may include a state machine for receiving messages (referred to herein as a "receive message machine") and a state machine (referred to herein as a "receive checksum machine") for generating checksums for messages while they are received. If the receive machine 222 is in state idle 1502 and the slave bus controller 280*b* indicates that it is being addressed for a byte read (that is, the slave bus controller 280*b* is being requested to provide data back to the master device), the receive message machine requests a checksum from the receive checksum machine and transitions to state get_checksum 1508 (arc 1524).

If the receive machine 222 is in state idle 1502 and the slave bus controller 280*b* indicates that it is being addressed as slave, and has detected a "stop" condition, the receive machine 222 acknowledges the bus controller 208, sets the saw_stop status flag, and transitions to state wait_not_slave_int 1514 (arc 1526).

If the receive machine 222 is in state idle 1502 and none of the above-described conditions exist, the receive machine 222 takes no action and remains in state idle 1502 (arc 1518*c*).

If the receive machine 222 is in state slave_receive 1504 and the receive FIFO 226 is full, the receive machine 222 takes no action and remains in state slave_receive 1504 (arc 1530). This has the effect of stalling the bus 202. If the receive machine is in state slave_receive 1504 and the receive FIFO 226 is not full, the receive machine 222 writes the incoming message byte to the receive FIFO 226 and transitions to state write_FIFO 1506 (arc 1532).

If the receive machine 222 is in state write_fifo 1506 and the current message byte is still being written into the receive FIFO 226, the receive machine 222 remains in state write_fifo 1506 (arc 1534). If the receive machine is in state write_fifo 1506 and writing of the current message byte to the receive FIFO 226 is complete, the receive machine 222 acknowledges the slave bus controller 280*b*, sets the received_byte status flag, and transitions to state wait_not_slave_int 1514 (arc 1536).

The receive machine 222 may include a "processor checksum valid" register that indicates whether the processor checksum 236*i* is valid, and which is initially cleared (not set). If the receive machine 222 is in state get_checksum 1508 and the processor checksum valid" bit 286*d* is not yet set, the receive machine 222 holds the "request checksum" flag and remains in the get_checksum state 1508 (arc 1538). If the receive machine 222 is in state get_checksum 1508 and the "checksum valid" flag has been set, the receive machine 222 enables the "checksum data path" (which allows the receive checksum machine 284*b* to drive data into the slave bus controller 280*b* rather than the receive FIFO 226) and transitions to the state write_checksum 1550 (arc 1540).

If the receive machine 222 is in state write_checksum 1550, the receive machine 222 writes the receive checksum 1012 to the slave bus controller 280*b*, and transitions to state slave_send 1512 (arc 1542). If the receive machine 222 is in state slave_send 1512, the receive machine 222 acknowledges the slave bus controller 280*b*, sets the wrote_checksum status flag and transitions to the state wait_not_slave_int 1514 (arc 1544).

If the receive machine 222 is in state wait_not_slave_int 1514 and the slave command signal (which indicated that some action had taken place on the bus 202) has not cleared, then the receive machine 222 continues to perform the current action, i.e., the action it was performing prior to entering state wait_not_slave_int 1514, and remains in state wait_not_slave int 1514 (arc 1546).

If the receive machine 222 is in state wait_not_slave_int 1514 and the slave command signals have cleared, but none of the status flags have been set, the receive machine 222 asserts the slave bus controller fault interrupt, resets the slave bus controller 280*b*, and transitions to state idle 1502 (arc 1438*a*). If the receive machine is in state wait_not_slave_int 1514, the slave command signals have cleared, and the saw_stop status flag is set, but the rcvd_byte and wrote_checksum flags are both clear, the receive machine 222 asserts the protocol fault interrupt, resets the slave bus controller 280*b*, and transitions to the idle state 1502 (arc 1548*b*). In this case, the protocol has been violated because a stop occurred on the bus 202, but no data was transmitted, and a checksum byte was not sent by the slave controller 280b.

If the receive machine 222 is in state wait_not_slave_int 1514, the slave command signals have cleared, and the wrote_checksum flag is set while the rcvd_byte flag has not been set, the receive machine asserts the protocol fault interrupt, resets the slave bus controller 280b, and transitions to state idle 1502 (arc 1548c). In this case, the protocol has been violated because no data has been sent, yet a checksum byte was requested.

If the receive machine 222 is in state wait_not_slave_int 1514, the slave command signals have cleared, and only the rcvd_byte flag is set, the receive machine 222 transitions to the idle state 1502 (arc 1548d). In this case, a message is in progress, and no protocol fault has been detected by the receive machine 222.

If the receive machine 222 is in state wait_not_slave_int 1514, the slave command signals have cleared, wrote_checksum is clear, and saw_stop and rcvd_byte are both set, then the receive machine 222 asserts the protocol fault interrupt, resets the slave bus controller 280b, and transitions to the idle state 1502 (arc 1548e). In this case, the protocol has been violated because the data packet had been transmitted, but a stop condition was seen on the bus 202 before the checksum byte was requested from the slave bus controller 280b.

If the receive machine 222 is in state wait_not_slave_int 1514, the slave interrupt has cleared, rcvd_byte and wrote_checksum are set, and saw_stop is clear, then the receive machine 222 transitions to the idle state 1502 (arc 1548f). In this case, a message is in progress, and no protocol fault has been detected by the receive machine 222.

If the receive machine 222 is in state wait_not_slave_int 1514, the slave command signals have cleared, and rcvd_byte, wrote_checksum, and saw_stop are all set, then the receive machine 222 sets the message completed flag, and transitions to the msg_done state 1516 (arc 1560). In this case, all elements to the protocol are in place, so the message has been completed.

If the receive machine 222 is in state msg_done 1516 while a byte timeout occurs and the slave bus controller 280b has been "addressed as slave", then the receive machine 222 resets the slave bus controller 280b and remains in the msg_done state 1516 (arc 1562a). In this case, the bus 202 has timed out, but a valid message is sitting in the receive FIFO 226 which the host processor 238 is probably reading.

If the receive machine 222 is in state msg_done 1516 and the host processor 238 has not acknowledged message completion, the receive machine 222 continues to assert the message complete interrupt and remains in the msg_done state 1516 (arc 1562b). Finally, if the receive machine 222 is in state msg_done 1516 and the host processor 238 has acknowledged message completion, the receive machine 222 transitions to the idle state 1502 (arc 1566).

Figure 16:
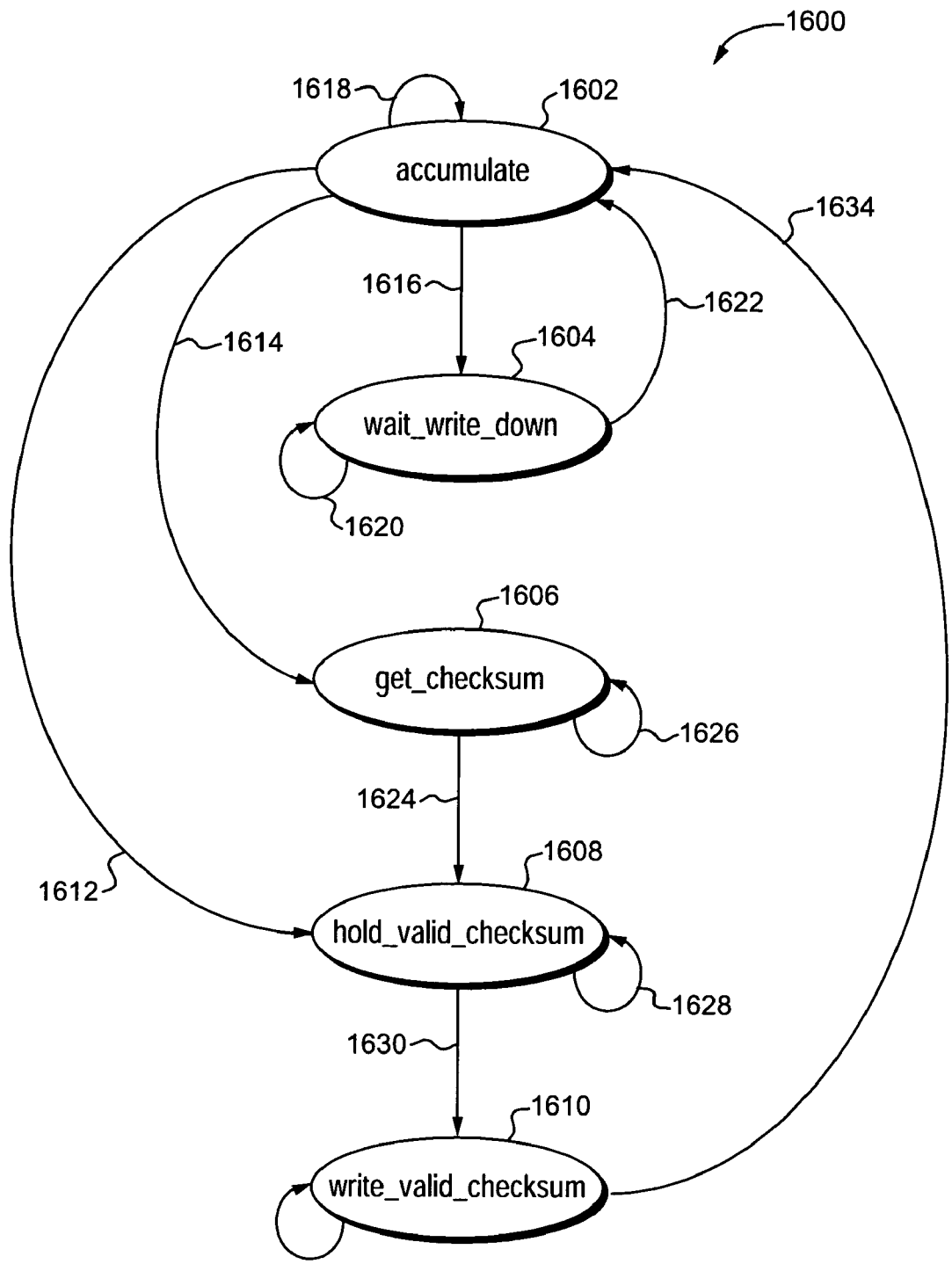
FIG. 16 is a finite state machine diagram illustrating a finite state machine implemented by the receive machine of FIG. 2A for generating a message checksum according to one embodiment of the present invention.

Techniques for generating a checksum of a message received by the transceiver 270 were described above with respect to FIGS. 9-10. Particular techniques that may be used by the receive machine 222 to perform method 900 when the bus 202 is an I²C bus will now be described. Referring to FIG. 16, a finite state machine diagram 1600 is shown illustrating a finite state machine implemented by the receive machine 222 according to one embodiment of the present invention to generate a checksum for a message as the message is being received over the bus 202 by the transceiver 270. In particular, the finite state machine illustrated by diagram 1600 may generate a checksum for a message while the message is being received by the finite state machine illustrated by diagram 1500 in FIG. 15.

Figure 2B:
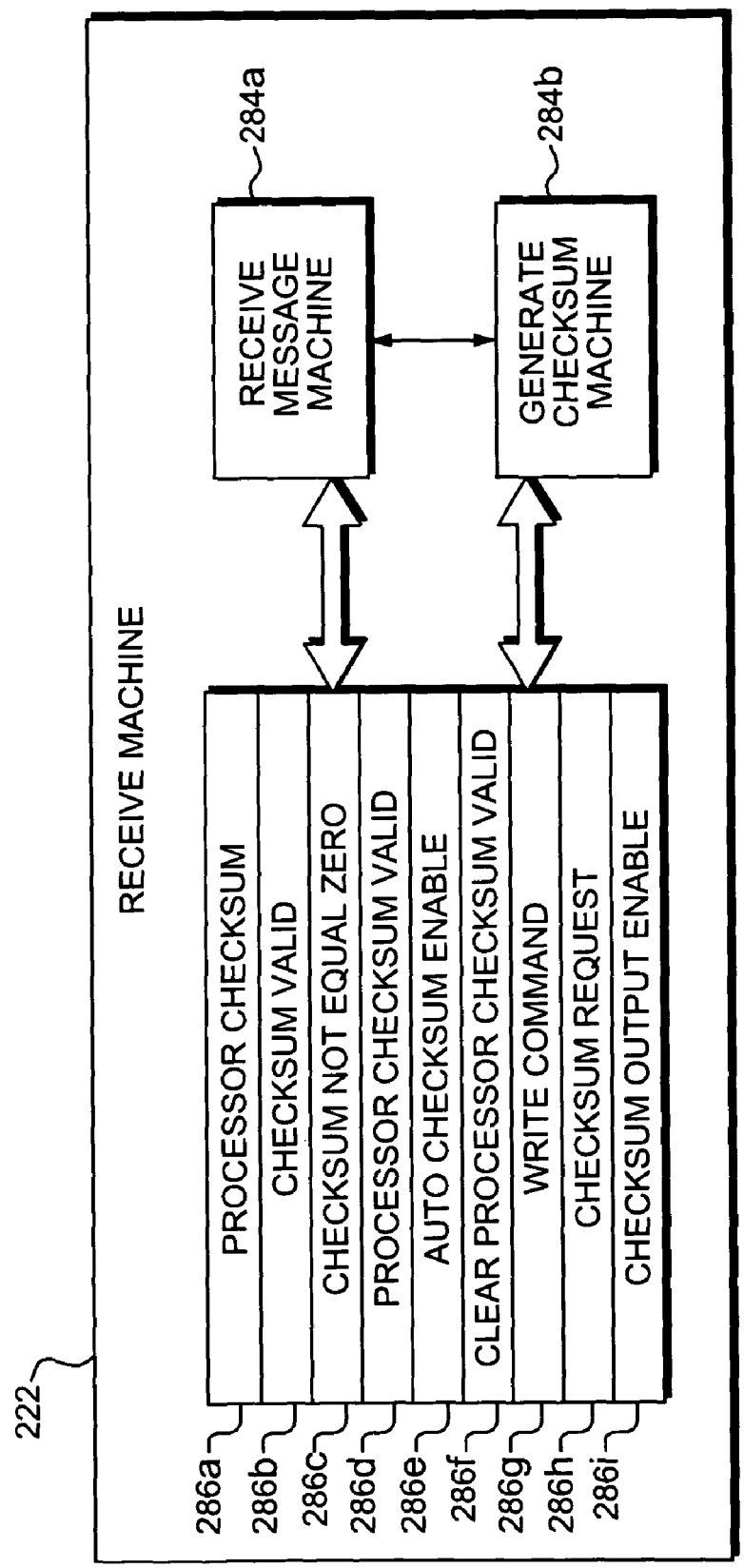
FIG. 2B is a diagram of the receive machine of FIG. 2A according to one embodiment of the present invention.

Referring to FIG. 2B, a diagram is shown illustrating the receive machine 222 in more detail according to one embodiment of the present invention. The embodiment of the receive machine 222 shown in FIG. 2B includes a "receive message machine" 284a that implements the finite state machine illustrated by diagram 1500 in FIG. 15, and a "generate checksum machine" 284b that implements the finite state machine 1600 illustrated by diagram 1600 in FIG. 16. The receive machine 222 also includes several bytes for use by the state machines 284a-b. For example, the receive machine 222 may include a processor checksum byte 286a (which is a register accessible to the host processor 238), a processor checksum valid 286d byte (indicating that the data in the processor checksum register 286a is valid), a clear processor checksum valid register 286f (a handshake to indicate that the generate checksum machine 284b has received the valid processor checksum byte 286a, a write command register 286g, a checksum valid signal 286b (used by the generate checksum machine 284b to indicate the validity of the checksum byte 286a to the receive message machine 284a), a checksum not equal zero status bit 286c, (to signal to the host processor whether the checksum was equal to zero), and a checksum output enable signal 286i (which, when asserted, causes the datapath into the slave bus controller 280b to be connected to the generate checksum machine 284b rather than to the receive FIFO 226), all of which may be cleared when the receive machine 222 is reset. The receive machine 222 may also include an auto checksum enable 286e bit (allowing the processor to override the automatic checksum generation performed by the generate checksum machine 284b) and a checksum request internal signal 286h used by the receive message machine 284a to request the current checksum from the generate checksum machine 284b.

After being reset, the checksum generation machine 284b enters the accumulate state 1602. If the checksum generation machine 284b is in state accumulate 1602, the auto checksum enable bit 286e is enabled, and the checksum request signal 286h is asserted, then the checksum generation machine 284b: (1) maintains the current value of the checksum byte 286a; (2) asserts the checksum valid signal 286b to the receive message machine 284a; (3) calculates the value of the checksum not equal zero signal 286c (by asserting the signal 286c if the checksum byte 286a is not equal to zero and by deasserting the signal 286c otherwise); (4) keeps the clear processor checksum valid signal 286d cleared; and (5) transitions to state hold_valid_checksum 1608 (arc 1612).

If the checksum generation machine 284b is in state accumulate 1602, the auto checksum bit 286e is not enabled, and the checksum request signal 286h is asserted, then the checksum generation machine 284b: (1) maintains the current value of the checksum byte 286a; (2) keeps the checksum valid signal 286b, checksum not equal zero signal 286c, and clear processor checksum valid signal 286d all cleared; and (3) transitions to state get_checksum 1606 (arc 1614).

If the checksum generation machine 284b is in state accumulate 1602 and the write command signal 286g is asserted, then the checksum generation machine 284b: (1) performs a logical XOR on the data currently being received by the receive machine 222 with the current checksum byte 286a; (2) keeps the checksum valid signal 286d, checksum not equal zero signal 286c, and the clear processor checksum valid signal 286d cleared; and (3) transitions to state wait_write_done 1604 (arc 1616).

If the checksum generation machine 284b is in state accumulate 1602 and there is no status change, the checksum generation machine 284b: (1) maintains the current value of the checksum byte 286a; (2) keeps the checksum valid signal 286b, checksum not equal zero signal 286c, and clear processor checksum valid signal 286d cleared; (3) and remains in state accumulate 1602 (arc 1618).

If the checksum generation machine 284b is in state wait_write_done 1604 and the write command is asserted, then the checksum generation machine 284b: (1) maintains the current value of the checksum byte 286a; (2) keeps the checksum valid signal 286b, checksum not equal zero signal 286c, and clear processor checksum valid signal 286d cleared; and (3) remains in state wait_write_done 1604 (arc 1620).

If the checksum generation machine 284b is in state wait_write_done 1604 and the write command 286g has cleared, then the checksum generation machine 284b: (1) maintains the current value of the checksum byte 286a; (2) keeps the checksum valid signal 286b, checksum not equal zero signal 286c, and clear processor checksum valid signal 286d cleared; and (3) transitions to state accumulate 1602 (arc 1622).

If the checksum generation machine 284b is in state get_checksum 1606 and the processor checksum 286a is valid, then the checksum generation machine 284b: (1) copies the processor checksum byte 286a written by the host processor 238 to the checksum byte register; (2) asserts the checksum valid signal 286b; (3) keeps the checksum not equal zero signal 286c and clear processor checksum valid signal 286d cleared; (4) and transitions to state hold_valid_checksum 1608 (arc 1624).

If the checksum generation machine 284b is in state get_checksum 1606 and the checksum generation machine 284b is waiting for the processor checksum valid signal 286d to be asserted, then the checksum generation machine 284b: (1) maintains the current value of the checksum byte 286a; (2) keeps the checksum valid signal 286b, the checksum not equal to zero signal 286c, and the clear processor checksum valid signal 286d cleared; and (3) remains in state get_checksum 1606 (arc 1626).

If the checksum generation machine 284b is in state hold_valid_checksum 1608 and the checksum output enable command signal 286i from the receive message machine 284a is not asserted, then the checksum generation machine 284b: (1) maintains the current value of the checksum byte 286a; (2) asserts the checksum valid signal 286b; (3) keeps the checksum not equal zero signal 286c and the clear processor checksum valid signal 286a cleared; and (4) remains in state hold_valid_checksum 1608 (arc 1628).

If the checksum generation machine 284b is in state hold_valid_checksum 1608 and the checksum output enable command signal 286i from the receive message machine 284a is asserted, then the checksum generation machine 284b maintains the current value of the checksum byte 286a; (2) asserts the checksum valid signal 286b; (3) keeps the checksum not equal zero signal 286c and clear processor checksum valid signal 286d cleared; and (4) transitions to state write_valid_checksum 1610 (arc 1630).

If the checksum generation machine 284b is in state write_valid_checksum 1610 and checksum output enable 286i is asserted, then the checksum generation machine 284b: (1) holds the checksum byte 286a; (2) asserts the checksum valid signal 286b; (3) keeps the checksum not equal zero signal 286c and the clear processor checksum valid signal 286d cleared; and (4) remains in state write_valid_checksum 1610 (arc 1632).

Finally, if the checksum generation machine 284b is in state write_valid_checksum 1610 and the checksum output enable signal 286i is de-asserted, then the checksum generation machine 284b: (1) clears the current checksum byte 286a, the checksum valid signal 286b, and the checksum not equal zero signal 286c; (2) asserts the clear processor checksum valid signal 286d; and (3) returns to state accumulate 1602 (arc 1634).

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. Furthermore, the transceiver 270 need not include all of the components shown in FIG. 2A. For example, the transceiver 270 may include the send machine 210 and receive machine 222 while omitting the fair arbitration block 272 and byte timer 260.

The transceiver 270 and/or one or more of its components may be implemented in hardware, firmware, software, or any combination thereof. For example, in one embodiment of the present invention the send machine 210, send FIFO 214, receive machine 222, receive FIFO 226, fair arbitration block 272, byte timer 260, and bus controller 208 are implemented in hardware generated using a description written in a hardware description language such as Verilog. Although the send machine 210 and receive machine 222 are described herein as finite state machines, the send machine 210 and receive machine 222 need not be specified or otherwise implemented as finite state machines.

Although in examples above the bus 202 may be referred to as an I²C bus, this is not a limitation of the present invention. Furthermore, although the bus 202 may be referred to as being implemented in accordance with version 2.1 of the I²C bus specification, the bus 202 may be implemented in accordance with any version of the I²C bus specification. More generally, the bus 202 may be any kind of bus. Furthermore, although the bus 202 is illustrated in FIG. 2A as a serial bus including the single clock line 202 and the single data line 206, this is not a limitation of the present invention. The bus 202 may be a serial or parallel bus. Furthermore, the bus 202 may be a shared (common) bus or a bus that allows point-to-point connections. The bus 202 may provide support for multiple bus masters as allowed, for example, by the I²C bus specification.

What is claimed is:

1. A computer system comprising:
   a system bus implemented in accordance with an Inter-IC bus specification;
   a bus controller coupled to the system bus and to a first internal bus;
   a send machine coupled between a host processor and the bus controller over a second internal bus;
   a first first-in first-out (FIFO) buffer coupled to the send machine, the first FIFO further coupled in parallel with the send machine between the host processor and the bus controller over the first internal bus but not over the system bus;
   a receive machine coupled between the host processor and the bus controller, the receive machine comprising means for generating a message checksum for a message while the message is being received by the bus controller over the system bus; and a second FIFO buffer coupled to the receive machine and coupled between the host processor and the bus controller.

2. The computer system of claim 1, wherein the first FIFO buffer comprises means for receiving a plurality of bytes from the host processor without interrupting the host processor.

3. The computer system of claim 1, wherein:
the first FIFO buffer comprises means for receiving a plurality of bytes from the host processor; and
the send machine comprises means for transmitting the plurality of bytes over the system bus without interrupting the host processor.

4. The computer system of claim 1, further comprising:
means for receiving a message from the host processor;
means for attempting to send the message over the system bus to a target device;
means for determining whether the message was received without errors by the target device; and
retry means for attempting again to send the message over the system bus to the target device if it is determined that the message was not received without errors by the target device.

5. The computer system of claim 4,
wherein the retry means comprises means for attempting again to send the message over the system bus to the target device without interrupting the host processor if it is determined that the message was not received without errors by the target device.

6. The computer system of claim 4,
wherein the retry means comprises means for attempting again to send the message over the system bus to the target device without obtaining the message again from the host processor if it is determined that the message was not received without errors by the target device.

7. The computer system of claim 1, further comprising:
busfree count means for storing a busfree count associated with the computer system;
a busfree timer for use by the computer system to wait an amount of time specified by the busfree count prior to attempting to access the system bus after the system bus becomes available for use; and
a fair arbitration block coupled between the host processor and the bus controller, the fair arbitration block comprising arbitration means for modifying the busfree count according to a priority signal to produce an arbitrated busfree count signal.

8. The computer system of claim 1, further comprising:
a byte timer coupled between the bus controller and the host processor.

9. The computer system of claim 8, wherein the byte timer comprises means for determining whether the host processor has failed and means for generating a signal indicating whether the host processor has failed.

10. A computer system comprising:
a system bus implemented in accordance with an Inter-IC bus specification;
a bus controller coupled to the system bus and to a first internal bus and a second internal bus;
a send machine coupled between a host processor and the bus controller over the second internal bus, the send machine comprising means for transmitting the plurality of bytes over the system bus without interrupting the host processor;
a first first-in first-out (FIFO) buffer coupled to the send machine, the first FIFO further coupled in parallel with the send machine between the host processor and the bus controller over the first internal bus but not over the system bus, the first FIFO comprising means for receiving a plurality of bytes from the host processor without interrupting the host processor;
a receive machine coupled between the host processor and the bus controller, the receive machine comprising:
means for receiving the plurality of bytes over the system bus without interrupting the host processor; and
means for generating a message checksum for a message while the message is being received by the bus controller over the system bus;
a second FIFO buffer coupled to the receive machine, the second FIFO further coupled between the host processor and the bus controller over a third internal bus, the second FIFO being coupled to the receive machine over the second internal bus but not over the system bus, the second FIFO buffer comprising means for receiving a plurality of bytes from the bus controller without interrupting the host processor.

11. The computer system of claim 10, further comprising:
means for receiving a message from the host processor;
means for attempting to send the message over the system bus to a target device;
means for determining whether the message was received without errors by the target device;
retry means for attempting again to send the message over the system bus to the target device without interrupting the host processor if it is determined that the message was not received without errors by the target device;
busfree count means for storing a busfree count associated with the computer system;
a busfree timer for use by the computer system to wait an amount of time specified by the busfree count prior to attempting to access the system bus after the system bus becomes available for use;
a fair arbitration block coupled between the host processor and the bus controller, the fair arbitration block comprising arbitration means for modifying the busfree count according to a priority signal to produce an arbitrated busfree count signal; and
a byte timer coupled between the bus controller and the host processor, the byte timer comprising means for determining whether the host processor has failed and means for generating a signal indicating whether the host processor has failed.

12. A computer system comprising:
a system bus;
a bus controller coupled to the system bus and to a first internal bus;
a send machine coupled between a host processor and the bus controller over a second internal bus, the send machine comprising means for transmitting the plurality of bytes over the system bus without interrupting the host processor;
a first first-in first-out (FIFO) buffer coupled to the send machine, the first FIFO further coupled in parallel with the send machine between the host processor and the bus controller over the first internal bus but not over the system bus, the first FIFO comprising means for receiving a plurality of bytes from the host processor without interrupting the host processor;
a receive machine coupled between the host processor and the bus controller, the receive machine comprising:
means for receiving the plurality of bytes over the system bus without interrupting the host processor; and
means for generating a message checksum for a message while the message is being received by the bus controller over the system bus;

a second FIFO buffer coupled to the receive machine, the second FIFO further coupled between the host processor and the bus controller over the second internal bus but not over the system bus, the second FIFO not being coupled to the receive machine over the second internal bus, the second FIFO buffer comprising means for receiving a plurality of bytes from the bus controller without interrupting the host processor;

means for receiving a message from the host processor;

means for attempting to send the message over the system bus to a target device;

means for determining whether the message was received without errors by the target device;

retry means for attempting again to send the message over the system bus to the target device without interrupting the host processor if it is determined that the message was not received without errors by the target device;

busfree count means for storing a busfree count associated with the computer system;

a busfree timer for use by the computer system to wait an amount of time specified by the busfree count prior to attempting to access the system bus after the system bus becomes available for use;

a fair arbitration block coupled between the host processor and the bus controller, the fair arbitration block comprising arbitration means for modifying the busfree count according to a priority signal to produce an arbitrated busfree count signal; and a byte timer coupled between the bus controller and the host processor, the byte timer comprising means for determining whether the host processor has failed and means for generating a signal indicating whether the host processor has failed.

13. A computer system comprising:

a system bus;

a bus controller coupled to the system bus and to a first internal bus and a second internal bus;

a send machine coupled between a host processor and the bus controller over the second internal bus, the send machine comprising means for transmitting the plurality of bytes over the system bus without interrupting the host processor;

a first first-in first-out (FIFO) buffer coupled to the send machine, the first FIFO further coupled in parallel with the send machine between the host processor and the bus controller over the first internal bus but not over the system bus, the first FIFO comprising means for receiving a plurality of bytes from the host processor without interrupting the host processor;

a receive machine coupled between the host processor and the bus controller, the receive machine comprising means for receiving the plurality of bytes over the system bus without interrupting the host processor and means for generating a message checksum for a message while the message is being received by the bus controller over the system bus without interrupting the host processor; and a second FIFO buffer coupled to the receive machine, the second FIFO further coupled between the host processor and the bus controller over the second internal bus but not over the system bus, the second FIFO not being coupled to the receive machine over the second internal bus, the second FIFO buffer comprising means for receiving a plurality of bytes from the bus controller without interrupting the host processor.

14. A device for use in a computer system including a system bus and a bus controller coupled to the system bus and to a first internal bus and a second internal bus, the device comprising:

a send machine coupled between a host processor and the bus controller over a second internal bus, the send machine comprising means for transmitting the plurality of bytes over the system bus without interrupting the host processor;

a first first-in first-out (FIFO) buffer coupled to the send machine, the first FIFO further coupled in parallel with the send machine between the host processor and the bus controller over the first internal bus but not over the system bus, the first FIFO comprising means for receiving a plurality of bytes from the host processor without interrupting the host processor;

a receive machine coupled between the host processor and the bus controller, the receive machine comprising:
  means for receiving the plurality of bytes over the system bus without interrupting the host processor; and
  means for generating a message checksum for a message while the message is being received by the bus controller over the system bus;

a second FIFO buffer coupled to the receive machine, the first FIFO further coupled between the host processor and the bus controller over the second internal bus but not over the system bus, the second FIFO not being coupled to the receive machine over the second internal bus, the second FIFO buffer comprising means for receiving a plurality of bytes from the bus controller without interrupting the host processor;

busfree count storage means for storing a busfree count associated with the computer system;

a busfree timer for use by the computer system to wait an amount of time specified by the busfree count prior to attempting to access the system bus after the system bus becomes available for use; and a fair arbitration block coupled between the host processor and the bus controller, the fair arbitration block comprising arbitration means for modifying the busfree count according to a priority signal to produce an arbitrated busfree count signal.

* * * * *